(12) United States Patent
Kornfein et al.

(10) Patent No.: US 6,745,195 B1
(45) Date of Patent: Jun. 1, 2004

(54) SYSTEM, METHOD AND COMPUTER PROGRAM PRODUCT FOR GENERATING SOFTWARE CARDS THAT SUMMARIZE AND INDEX INFORMATION

(75) Inventors: Mark Mitchell Kornfein, Latham, NY (US); Rasiklal Punjalal Shah, Latham, NY (US); Russell Robert Irving, Ballston Lake, NY (US); Mark Kathleen Parini, St. Louis, MO (US)

(73) Assignee: General Electric Company, Niskayuna, NY (US)

( * ) Notice: Subject to any disclaimer, the term of this patent is extended or adjusted under 35 U.S.C. 154(b) by 302 days.

(21) Appl. No.: 09/663,144

(22) Filed: Sep. 15, 2000

(51) Int. Cl.[7] ................................................ G06F 7/00
(52) U.S. Cl. .................. 707/102; 707/104.1; 707/2; 434/118; 434/219
(58) Field of Search .................. 707/104.1, 102, 707/2; 434/118, 219, 365

(56) References Cited

U.S. PATENT DOCUMENTS

| 5,548,714 A | | 8/1996 | Becker | |
|---|---|---|---|---|
| 5,623,679 A | * | 4/1997 | Rivette et al. | 707/526 |
| 5,694,594 A | * | 12/1997 | Chang | 707/6 |
| 5,806,079 A | * | 9/1998 | Rivette et al. | 707/512 |
| 5,809,318 A | * | 9/1998 | Rivette et al. | 707/512 |
| 5,890,175 A | * | 3/1999 | Wong et al. | 707/505 |
| 5,950,214 A | * | 9/1999 | Rivette et al. | 707/512 |
| 5,970,505 A | * | 10/1999 | Ebrahim | 707/501.1 |
| 6,212,494 B1 | * | 4/2001 | Boguraev | 704/9 |
| 6,321,244 B1 | * | 11/2001 | Liu et al. | 707/523 |
| 6,353,840 B2 | * | 3/2002 | Saito et al. | 707/517 |
| 6,389,434 B1 | * | 5/2002 | Rivette et al. | 707/512 |
| 6,467,080 B1 | * | 10/2002 | Devine et al. | 717/123 |

* cited by examiner

Primary Examiner—Safet Metjahic
Assistant Examiner—Brian Goddard
(74) Attorney, Agent, or Firm—David C. Goldman; Patrick K. Patnode

(57) ABSTRACT

A system, method and computer program product for generating software cards that summarize and index information. A documentation storage unit stores a variety of documentation. A software card generator generates each of the software cards for a predetermined card category. Each software card points to blocks of information stored in the documentation storage unit that relate to the predetermined card category. A software card database stores the generated plurality of software cards. A user can search the software cards in order to quickly and easily access documentation and materials specific to their specific area of interest.

99 Claims, 23 Drawing Sheets

FIG. 10c

SYSTEM, METHOD AND COMPUTER PROGRAM PRODUCT FOR GENERATING SOFTWARE CARDS THAT SUMMARIZE AND INDEX INFORMATION

BACKGROUND OF THE INVENTION

This disclosure relates generally to training systems and methods and more particularly to a tool for generating software cards that summarize and index information.

Traditional training systems and methods are useful in training field service personnel and operators of complex machinery such as medical imaging scanners. Typically, designers of the scanners prepare training material for training the field service personnel and operators. Training instructors will supplement the material generated by the designers with information produced from a variety of other sources such as engineering, marketing, manufacturing and service departments. Not all of the information provided by these sources is relevant for training purposes. Therefore, each training instructor will manually review all of the material and select various paragraphs, sections or chapters and use them in their training material. In addition, each training instructor will supplement the selected paragraphs, sections and chapters with their own material and insights. Each training instructor then compiles all of their material into a set of structured training modules, which are presented to a group of field service personnel and operators.

Each training instructor that participates in this type of training method faces a challenge with respect to information integration. In particular, for identical or closely related modules, it is likely that each training instructor will have to locate the same material. Since each training instructor has his or her own teaching style, the modules will differ for each instructor because of their selected paragraphs, sections, chapters and notes. Therefore, each training instructor has to create a module that is specific to his or her teaching style. The process of creating materials and class notes for a training module is time consuming and slow. This process is complicated further because the training modules have to be continually updated for new classes and any changes made to equipment documentation.

Tailoring to the needs of the field service personnel and operators is another challenge facing each training instructor. This challenge arises because people (e.g., training instructors and document authors) who are not familiar with the constraints imposed on the field service personnel and operators create a majority of the training material. In addition, typically, only a small portion of information in any one of the various sources of training material is of interest to a specific group of field service personnel and operators. Also, since the training needs of any group of field service personnel and operators is diverse and changing with time, any attempts to create a single structured training course material for an entire training class will involve many compromises.

Therefore, there is a need for an innovative approach that will allow a training instructor to easily and rapidly locate and gather training materials for a training course. Also, this approach should allow field service personnel and equipment operators to easily access training material that is tailored to a specific training goal or a task that is to be completed in the field.

BRIEF SUMMARY OF THE INVENTION

In one embodiment of this disclosure, there is a system, method and computer readable medium that stores instructions for instructing a computer system, to generate a plurality of software cards from information contained in a plurality of documentation. In this embodiment, a documentation storage unit stores the plurality of documentation. A software card generator generates each of the plurality of software cards for a predetermined card category. Each software card points to blocks of information stored in the documentation storage unit that relate to the predetermined card category. A software card database stores the generated plurality of software cards.

In a second embodiment of this disclosure, there is a system, method and computer readable medium that stores instructions for instructing a computer system, to manage a plurality of documentation. In this embodiment, a documentation storage unit stores the plurality of documentation. A software card database stores a plurality of software cards. Each software card points to blocks of information stored in the documentation storage unit that relate to a predetermined card category. A software card application structures the plurality of documentation stored in the documentation storage unit in accordance with the plurality of software cards stored in the software card database. A first computing unit is configured to execute the software card application.

In another embodiment, there is a system, method and computer readable medium that stores instructions for instructing a computer system, to manage a plurality of documentation. In this embodiment, a documentation storage unit stores the plurality of documentation. A software card database stores a plurality of software cards. Each software card points to blocks of information stored in the documentation storage unit that relate to a predetermined card category. A software card application structures the plurality of documentation stored in the documentation storage unit in accordance with the plurality of software cards stored in the software card database. A first computing unit is configured to execute the software card application. A second computing unit is configured to serve the documentation storage unit, the software card database, and the software card application to the first computing unit over a network.

In a further embodiment, there is a method for structuring information contained in a plurality of documentation into a plurality of software cards to facilitate training of personnel in servicing a machine. In this embodiment, a plurality of documentation that relate to at least one of training the personnel and servicing the machine is stored. Each of the plurality of software cards for a predetermined card category that relate to the at least one of training personnel and servicing of the machine is generated. Each software card points to blocks of information in the stored plurality of documentation that relate to the predetermined card category. The generated plurality of software cards are then stored. The plurality of stored software cards are queried to facilitate the training of the personnel. Previously saved queries and results are viewed to facilitate the training of the personnel. The blocks of information pointed to by each of the plurality of software cards are viewed to facilitate the training of the personnel.

In another embodiment, there is a method for displaying a plurality of software cards used to structure information contained in a plurality of documentation. In this embodiment, a screen view is displayed for generating each of the plurality of software cards for a predetermined card category. Each software card points to blocks of information in the plurality of documentation that relate to the predetermined card category. Also, a screen view is displayed for storing the plurality of generated software cards. Another screen view that is displayed is a view for querying the plurality of stored software cards. A further screen that is displayed is a view for viewing previously saved queries and results. Another screen view that is displayed is a view for viewing the blocks of information pointed to by each of the plurality of software cards.

An additional embodiment recites a computer-readable medium containing a collection of information for structuring a plurality of documentation. In this embodiment, there is a block table containing a plurality of fields for describing blocks of information in the plurality of documentation. A software card table contains a plurality of fields describing the information content of a block in the form of a software card. Also, a query table contains a plurality of fields describing previously saved queries. In addition, a view table contains a plurality of fields for viewing the blocks of information in the plurality of documentation.

BRIEF DESCRIPTION OF THE DRAWINGS

FIG. 1 shows a schematic of a general-purpose computer system in which a system for generating software cards that summarize and index information operates on;

DETAILED DESCRIPTION OF THE INVENTION

Figure 1:
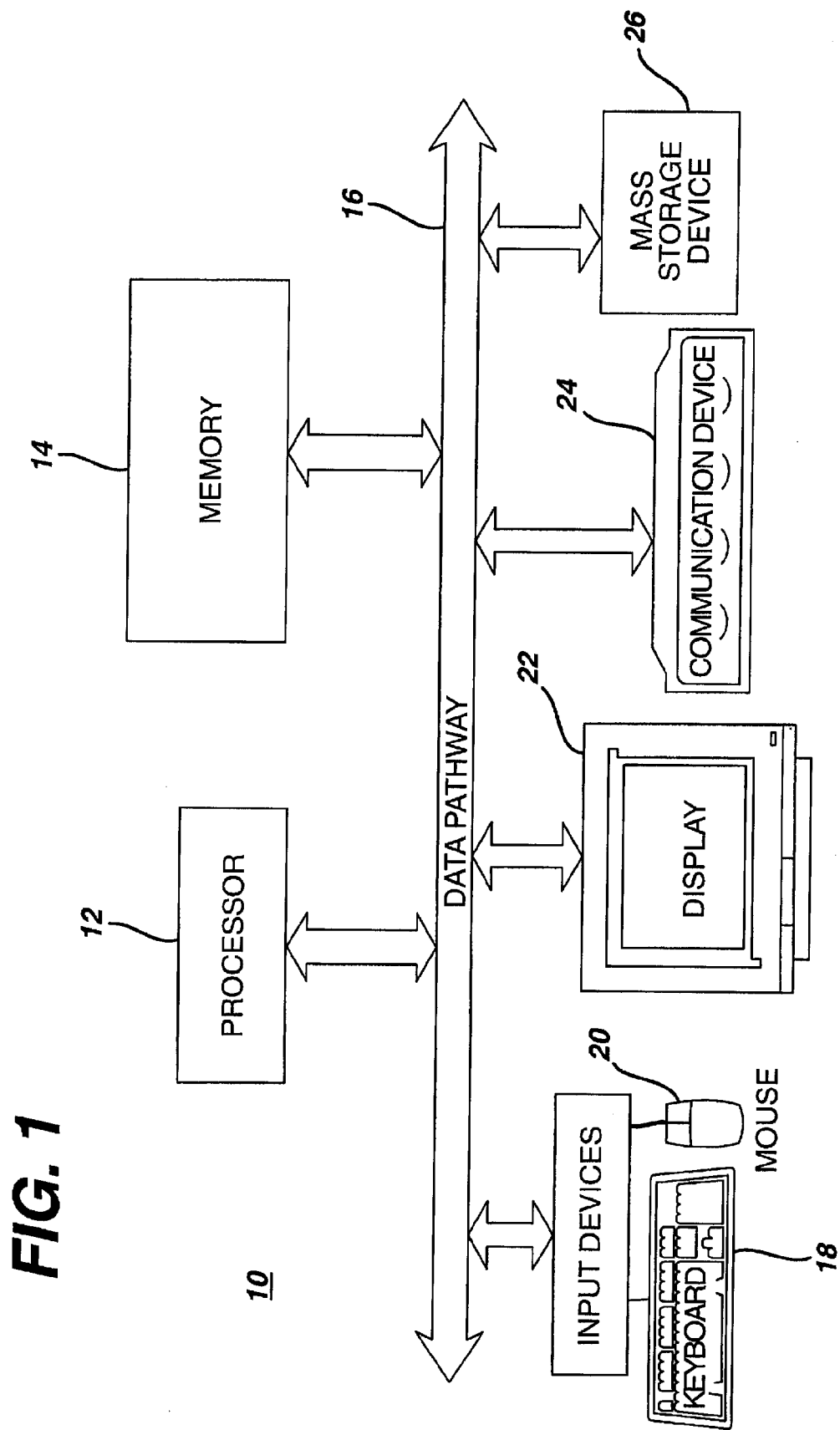

FIG. 1 shows a schematic of a general-purpose computer system 10 in which a system for generating software cards that summarize and index information operates on. The computer system 10 generally comprises at least one processor 12, a memory 14, input/output devices, and data pathways (e.g., buses) 16 connecting the processor, memory and input/output devices. The processor 12 accepts instructions and data from the memory 14 and performs various calculations. The processor 12 includes an arithmetic logic unit (ALU) that performs arithmetic and logical operations and a control unit that extracts instructions from memory 14 and decodes and executes them, calling on the ALU when necessary. The memory 14 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). Also, the memory 14 preferably contains an operating system, which executes on the processor 12. The operating system performs basic tasks that include recognizing input, sending output to output devices, keeping track of files and directories and controlling various peripheral devices.

The input/output devices may comprise a keyboard 18 and a mouse 20 that enter data and instructions into the computer system 10. A display 22 allows a user to see what the computer has accomplished. Other output devices may include a printer, plotter, synthesizer and speakers. A communication device 24 such as a telephone or cable modem or a network card such as an Ethernet adapter, local area network (LAN) adapter, integrated services digital network (ISDN) adapter, or Digital Subscriber Line (DSL) adapter, that enables the computer system 10 to access other computers and resources on a network such as a LAN or a wide area network (WAN). A mass storage device 26 allows the computer system 10 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer system 10 can take the form of a hand-held digital computer, personal digital assistant computer, personal computer, workstation, mini-computer, mainframe computer or supercomputer.

Figure 2:
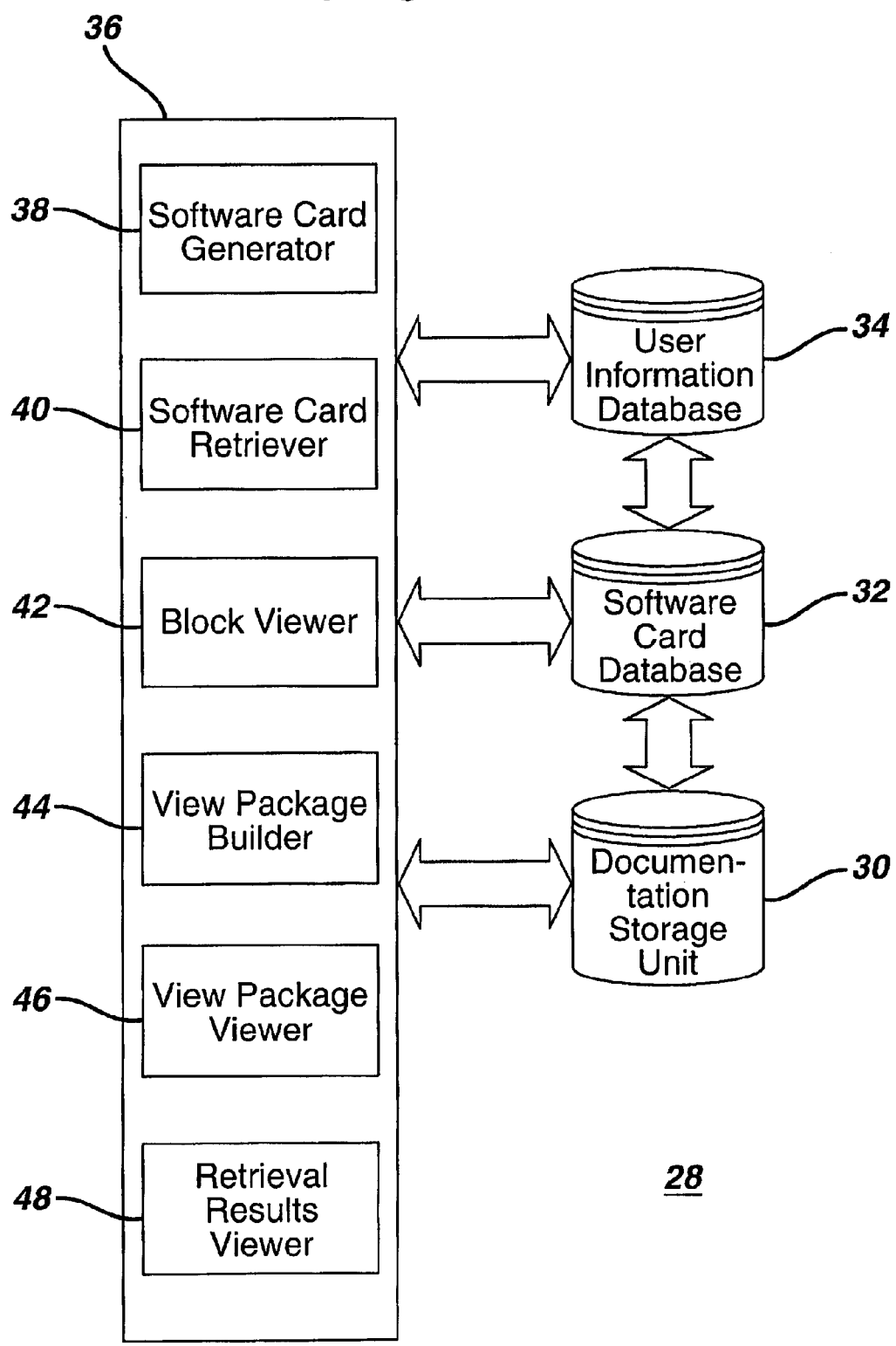
FIG. 2 shows a top-level component architecture diagram of the system for generating software cards that summarize and index information that operates on the computer system shown in FIG. 1.

FIG. 2 shows a top-level component architecture diagram of a system 28 for generating software cards that summarize and index information that operates on the computer system 10 shown in FIG. 1. In FIG. 2 there is a documentation storage unit 30 that contains information that users of the system 28 access. The documentation storage unit 30 comprises a variety of information that can be stored electronically or in a physical location. In the scenario where field service personnel and machine operators are trained to service and operate medical imaging scanners, the information may comprise service manuals, operator manuals, training manuals, service notes, field maintenance instructions, etc. Although this disclosure is described with reference to the training of field service personnel and operators of medical imaging scanners, the system 28 is suitable for use with any type of machine, equipment, system or process, where it is desirable to index and summarize information for training personnel.

A software card database 32 contains a plurality of software cards. A software card is a collection of attributes that describe a specific block of information stored in the documentation storage unit 30, as well as the location information of that block. A block is a portion of documentation stored in the documentation storage unit 30 that represents an entire document or a chapter, section, subsection paragraph, table or figure of a document. In addition, each software card relates to a predetermined card category. For example, in the scenario where field service personnel and operators are trained to service and operate medical imaging scanners, the predetermined card categories may comprise classifications such as functional checks, operating systems and schematics. These examples are illustrative of only a few categories and are not exhaustive.

Besides storing a catalog of software cards, the software card database 32 stores other information. For example, the software card database 32 stores view packages that provide a pre-ordered sequence of software cards to users. The view packages are suitable for creating training lessons, a standard procedure for repairing or maintaining some aspect of a scanner or any other useful and re-usable information. Furthermore, the software card database 32 stores query results generated by users of the system 28. Query results represent a collection of software cards saved by the user of the system 28 from a previous query that may be used at a later time.

A user information database 34 contains identity and security information for users of the system 28. Specifically, the user database 34 contains general information such as phone numbers, addresses, the type of user (e.g., trainees or trainers), e-mail addresses, passwords, login identification, information access privileges, etc.

A software card application 36 structures the plurality of documentation stored in the documentation storage unit 30 in accordance with the catalog of software cards stored in the software card database 32. The software card application 36 comprises a software card generation module 38 that generates each of the software cards for a predetermined card category. Specifically, the software card generation module 38 enables a trainer or author of cards to create, view, modify and delete selected software cards.

The software card application 36 also comprises a software card retrieval module 40 that queries the software card database 32 to find the software cards. This module enables a user to query the catalog of software cards through a menu driven interface to find the cards that relate to one of the predetermined card categories. Also, the software card retrieval module 40 can answer questions posed by a user. For example, a user could pose a question such as "How do I change the power supply in a type X scanner?" The software card retrieval module 40 will return the software cards in the correct sequence for accomplishing the task. In addition, the software card retrieval module 40 allows the user to save the query in the software card database 32. This permits a user to look at previous questions for which they felt that the result was of sufficient quality to use again. Furthermore, the software card retrieval module 40 allows the trainer or author of the software card to use query results to build the previously mentioned view packages.

A block viewing module 42 enables a user to view the blocks of information pointed to by each of the software cards. The block viewing module 42 is called by other modules of the software card application 36 when the user indicates that he or she wants to see a block. Typically, this happens because the block is part of a query result, a view package, or when the user is looking at the block's card in the software card generation module 38.

The software card application 36 also comprises a view package building module 44 and a view package viewing module 46. The view package building module 44 enables a trainer or authors of the software cards to build packages of the software cards in a predetermined order. The view package building module 44 also allows the trainers and authors to order the software cards so that a specific class lesson can be taught after being distributed and shared by service personnel and operators in the field. The view package viewing module 46 allows a user to navigate (i.e., go forward and backward, block by block) through a specific view package.

Another component of the software application 36 is a retrieval results viewing module 48. This module allows a user to find previously saved queries, view the saved results, and possibly modify saved query parameters and re-run the query to get updated results. When a query is saved, both the query parameters and the query results are saved.

In addition to the above modules, the software card application may comprise other modules that run utilities for performing special tasks. For example, there could be a utility that allows a user to create a subset of the software card database 32. Also, there may be other utilities such as utilities for administering and performing maintenance functions. Other utilities that may be used are utilities for creating, modifying and deleting user profiles and utilities for purging and archiving software cards and view packages.

Figure 3:
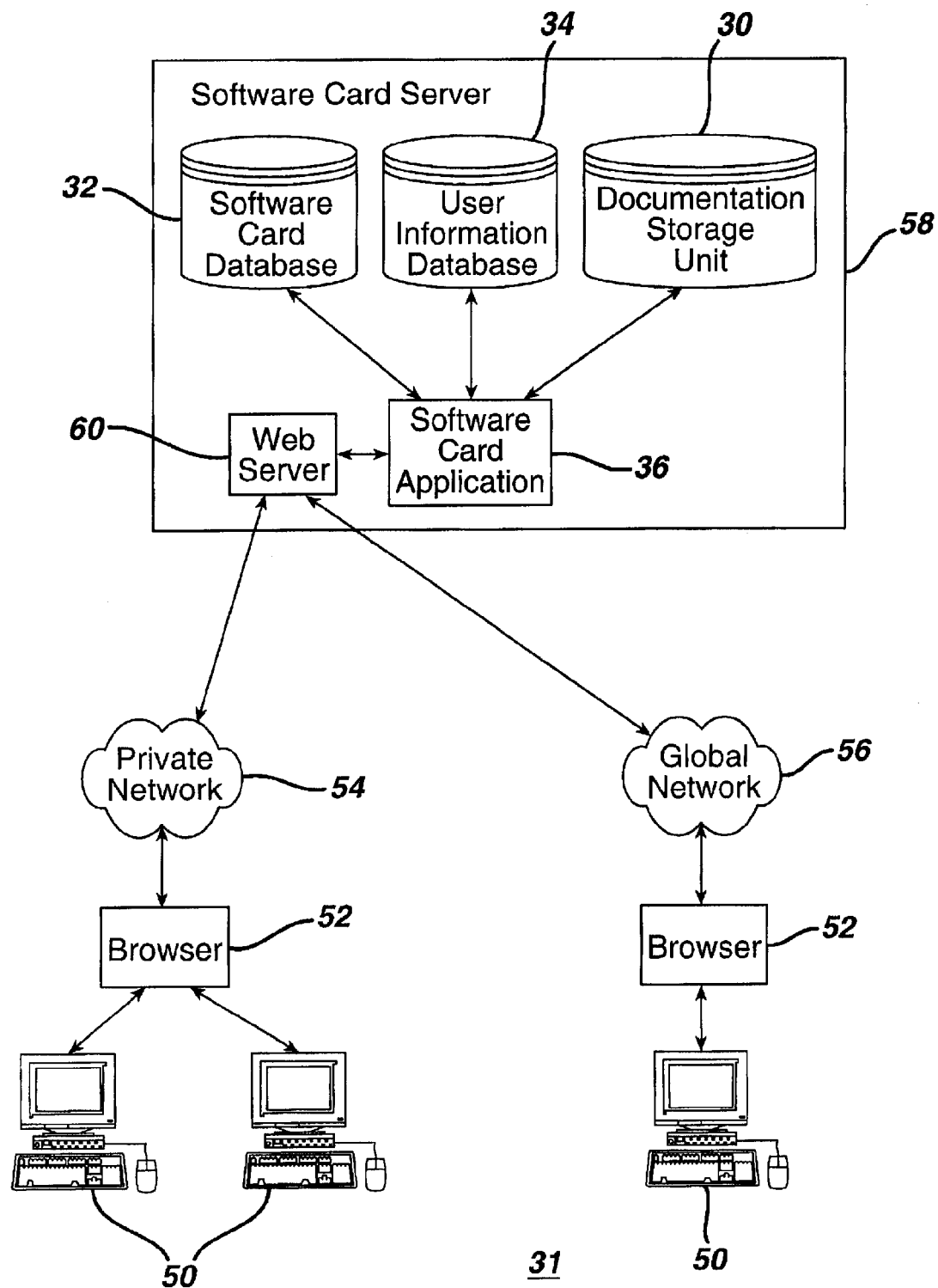
FIG. 3 shows a system architecture diagram for implementing the system shown in FIG. 2.

FIG. 3 shows a system 31 architecture diagram for implementing the system shown in FIG. 2. FIG. 3 shows that there are several ways of accessing the system 28. A computing unit 50 allows a trainer or a software card author to access the system 28. Also, the field service personnel and operators access the system 28 through a computing unit 50. Furthermore, other users such as administrators, external customers, etc. can access the system through a computing unit 50. The computing unit 50 can take the form of a hand-held digital computer, personal digital assistant computer, personal computer or workstation. The trainers, authors, field service personnel, operators and other users use a web browser 52 such as Microsoft INTERNET EXPLORER or Netscape NAVIGATOR to locate and display the system 28 on the computing unit 50. A communication network connects the computing unit 50 to the system 28. FIG. 3 shows that the computing units 50 may connect to the system 28 through a private network 54 such as an extranet or intranet or a global network 56 such as a WAN (e.g., Internet). For example, field service personnel and operators can access the system 28 via an extranet or intranet, while other users could access it through the Internet. The system 28 resides in a software card server 58, which comprises a web server 60 that serves the software card application 36, software card database 32, user information database 34 and the documentation storage unit 30 to a user.

As mentioned above, the documentation storage unit 30 contains documentation such as service manuals, operator manuals, training manuals, service notes, etc. This documentation is viewable in a variety of formats such as the portable document format (PDF), a file format developed by Adobe Systems or hypertext markup language (HTML). For documents that reside in a physical location, the documents can be manually retrieved and viewed as desired. The PDF and HTML formats are illustrative of a couple of formats that the documentation can be viewed in, however these are not exhaustive of other possibilities. Documents in PDF can be opened and viewed with Adobe ACROBAT READER, while HTML pages can be opened and viewed with a web browser such as Microsoft INTERNET EXPLORER or Netscape NAVIGATOR. The block viewing module 42 controls the flow of the documentation in the documentation storage unit 30. Below are more details of the block viewing module. If the documentation is available at a given time, the system 28 provides that information to the user. If the information is not available, the system 28 provides as much information to the user about where it can be found. For example, if the documentation is not in the specified location, then the system 28 returns an error indicating that the documentation is not available. Also, if the external documentation is in a format that cannot be read by the block viewing module, then the system 28 returns an error indicating that the document is in an invalid format.

The user information database 34 stores the identity and security information for users of the system 28. The user information database 34 can take the form of a lightweight directory access protocol (LDAP) database, however, other directory type databases can be used. The user information database 34 enables the system 28 to authenticate all on-line users accessing the system. In addition, the user information database 34 enables the system 28 to have an access control mechanism that allows users to have different roles, including administrators, field engineers, external customers, document writers, authors and possibly others. Therefore, depending on the role of the user, different access can be allowed to each module of the software card application 36. Both authentication and access control is handled at the web server level by a device such as a Netegrity Policy Server.

Figure 4:
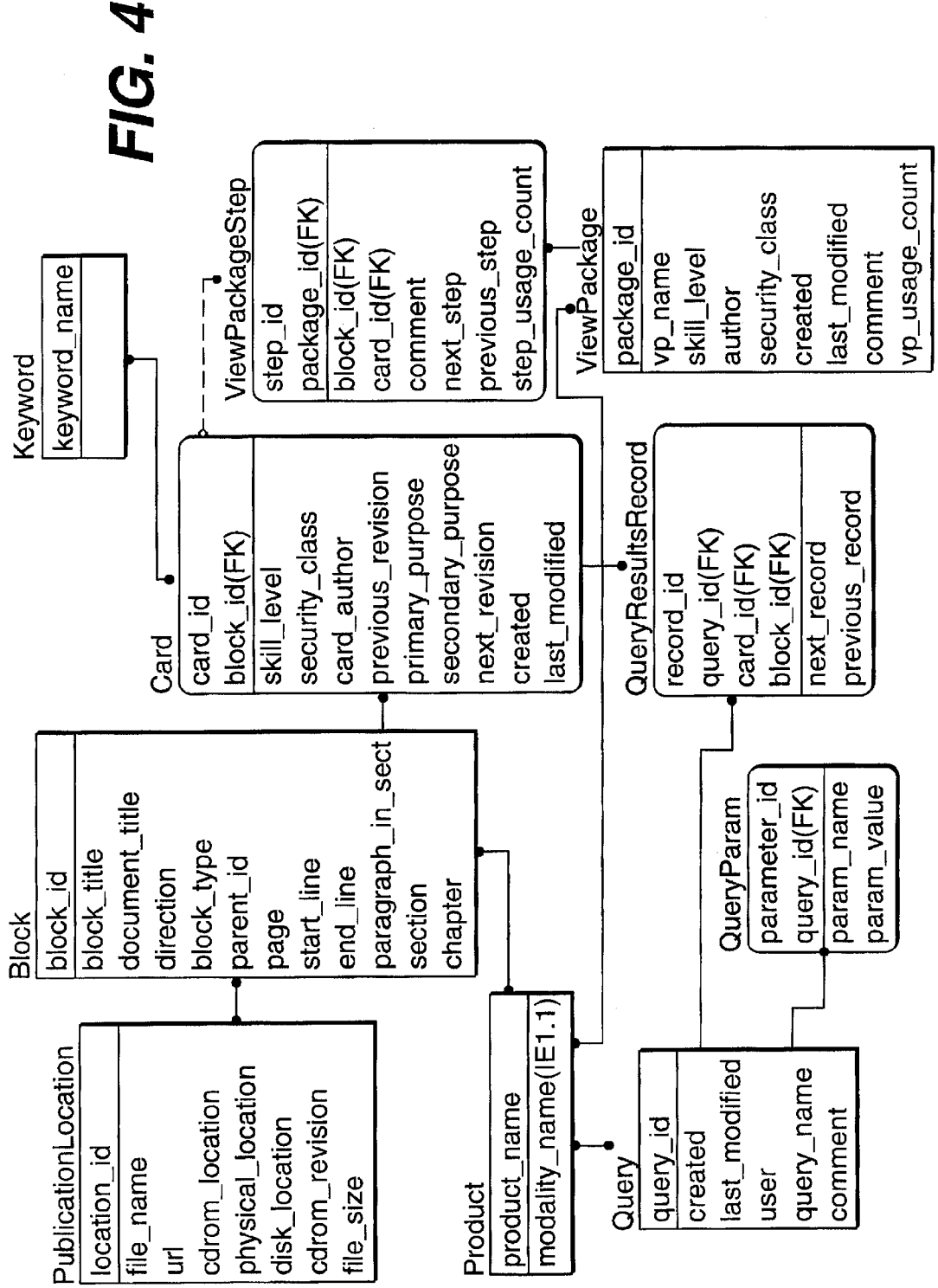
FIG. 4 shows a database schema for the software card database shown in FIG. 2.

As mentioned above, the software card database 32 stores software cards, view packages, and saved retrieval results. FIG. 4 shows a database schema for the software card database 32. The database schema comprises a plurality of tables, each having fields allocated for a particular item of information. Below is a listing of each of the tables in the schema and their respective fields.

The Block table includes the fields necessary to identify a portion of a document referred to as a block in the system 28. Its purpose is to describe where the information is. Below is a listing of the fields for the Block table and a brief description.

- block_id: Uniquely identifies a block;
- block_title: Title of the block. (e.g. Safety, Tube Replacement);
- document_title: Title of the document which the block points to;
- direction: Direction number or product number for the document which the pointed block relates to.
- block_type: What classification the block matches (e.g., document, chapter, section, figure, table, or list item);
- parent_id: Block id of the parent block in which this block resides. For example, Section 2.1's parent block is Section 2.
- page: Page number on which the block begins.
- Start_line: Line number on which the block begins.
- end_line: Line number on which the block ends.
- paragraph_in_section: Paragraph number in the section.
- section: Section number which the block is or is part of; and.
- chapter: Chapter number which the block is or is part of.

The Card table includes the fields necessary to describe the information content of a block in the system 28. Its purpose is to describe what the information is. Below is a listing of the fields for the Card table and a brief description. Note that FK stands for a foreign key, which is one or more table fields that refer to the primary key field or fields in another table.

- card_id: Uniquely identifies a card;
- block_id (FK): Points to the block to which this card describes;
- skill_level: Classifies the ideal skill level for a reader of this block as either novice, or expert based on the complexity of the block's content;
- card_author: Identifies the author of the card;
- security_class: Security class of the information block;
- previous_revision: Card_id of the card associated with the previous revision of this card's block of information. This field is used to retain pointers to old revisions of the source information;
- next_revision: Card_id of the card associated with the next revision of this card's block of information. This field is used to retain pointers to newer revisions of the source information;
- primary_purpose: Describes the primary purpose of this card;
- secondary purpose: Describes the secondary purpose of this card;
- created: The timestamp when the card was created; and
- last_modified: The timestamp when the card was last modified.

The PublicationLocation table includes the fields necessary to describe the location(s) of a document or publication. It is used in conjunction with the Block table to describe where the information is. Below is a listing of the fields for the PublicationLocation table and a brief description.

- location_id: Uniquely identifies a location;
- file_name: Name of the file located on the hard disk or CDRom;
- url: Link used to retrieve the publication if it is located on the Web;
- cdrom_location: Path information necessary to retrieve the file from the CDRom. Used in conjunction with the filename;
- disk_location: Path information necessary to retrieve the file from the hard disk. Used in conjunction with the filename;
- physical_location: Information necessary to retrieve the publication from a location/format not accessible directly from the system 28. For example, this field might read, "Building 1, Room 2A".
- cdrom_revision: The revision number of the cdrom the document is located on; and
- file_size: The size of the document.

The Product table lists all product names. Below is a listing of fields for the Product table and a brief description.

- product_name: Name of the product. An additional product name can also be allowed for each modality to allow items which match all products of a given modality; and
- modality_name: Name of the modality to which a product belongs to.

The Keyword table lists all key words that exist in the system 28. Below is a field for the Keyword table and a brief description.

- keyword_name: Name of the keyword.

The ViewPackage table describes the view packages available in the system 28. Below is a listing of the fields for the ViewPackage table and a brief description.

- package_id: Uniquely identifies a View Package;
- vp_name: Name assigned to the View Package;
- vp_author: Identifies the author of the view package;
- security_class: The security class of the view package;
- skill_level: Classifies the ideal skill level for a reader of this View Package as either novice, or expert based on the complexity of the View. Package's content. Skill level is determined by the author of the View Package. Ideally the skill level of the View Package is similar to the skill level of the individual cards contained in the View Package. However, it is up to the author to make this determination;
- created: Timestamp when the card was created;
- last_modified: Timestamp when the card was last modified;
- comment: Allows the author to add descriptive text to the View Package;
- vp_usage_count: A running count of the usage of this view package; and step_usage_count: A running count of the use of this step in the view package.

The ViewPackageStep table holds all of the steps of the view package in the system 28. Each view package is made up of multiple view package steps. The table also stores information necessary to navigate through the steps in the view package. Below is a listing of the fields for the ViewPackageStep table and a brief description. Note that FK stands for foreign key.

step_id: Uniquely identifies a step;

package_id (FK): View package id of the view package that a step is a part of;

block_id (FK): Block id of the block that a step points to;

card_id (FK): Card id of the card that a step points to;

next_step: Step id of the next step in the view package; and previous step: Step id of a previous step in the view package.

The Query table stores the queries saved by the end users of the system 28. Below is a listing of the fields for the Query table and a brief description.

query_id: Uniquely identifies a query;

created: Timestamp when the card was created;

last_modified: Timestamp when the card was last modified;

user: Name of the user that saved the query;

query_name: Name assigned to the query; and comment: Allows the user to add descriptive text to their saved query.

The QueryResultRecord table holds all of the records of saved query results in the system 28. Each saved query is made up of multiple records. The table also stores information necessary to navigate through the records in the saved query results. Below is a listing of the fields for the QueryResultRecord table and a brief description. Note that FK stands for foreign key.

record_id: Uniquely identifies a query result record;

query_id (FK): Query id of the saved query that a record is a part of;

block_id (FK): Block id of the block that a record points to;

card_id (FK): Card id of the card that a record points to;

next_record: Record id of the next record in the query results; and previous_record: Record id of the previous record in the query results.

The QueryParam table stores the parameter names and values for the parameters of saved queries. With this information, the query can be reconstructed and the user and can rerun the query to get up-to-date information. Below is a listing of the fields for the QueryParam table and a brief description. Note that FK stands for foreign key.

parameter_id: Uniquely identifies a parameter.

query_id (FK): Query id of the saved query that a parameter belongs to;

param_name: Name of a parameter; and value: Value of a parameter.

The database schema shown in FIG. 4 also defines the relationships between each of the tables and their respective fields. Below is a listing and brief description of the relationships between each of the tables in the schema.

The Block-Card table relationship is one-to-many. Each card points to one block, but a block may be pointed to by multiple cards. Also, a card may not exist unless it points to a block that exists.

The Block-PublicationLocation table relationship is many-to-many. A block may have multiple locations. Likewise, a single location may contain many blocks.

The Modality-Product table relationship is one-to-many. A modality has many products but a product is only part of one modality. A product may not exist unless it points to a modality that exists. A special product name will act as wildcard allowing one to associate cards, view packages, and queries to a modality rather than to specific products in the modality.

The Block-Product table relationship is many-to-many. A block can be classified under many products and a product can be associated with many blocks.

The Card-Keyword table relationship is many-to-many. A card has many keywords and a single keyword may be part of many cards.

The Card-Category table relationship is many-to-many. A card has many categories and a single category may be part of many cards.

The ViewPackage-Product table relationship is many-to-many. A view package can be classified under many products and a product can be associated with many view packages.

The ViewPackage-ViewPackageStep table relationship is one-to-many. A view package contains many steps but a step is only part of one view package. A view package step may not exist unless it points to a view package that exists.

The Card-ViewPackageStep table relationship is one-to-many. A card may be pointed to by many view package steps, but a view package step can only point to one card. It is allowable to create a view package step that does not point to an existing card.

The Query-Product table relationship is many-to-many. A query can be classified under many products and a product can be associated with many queries.

The Query-QueryParam table relationship is one-to-many. A query contains many parameters, but a parameter is only associated with one query. A parameter may not exist unless it points to a query that exists.

The Query-QueryResultRecord table relationship is one-to-many. A query contains many records but a record is only part of one query result. A record may not exist unless it points to a query that exists.

The Card-QueryResultRecord table relationship is one-to-many. A card may be pointed to by many query result records, but a record can only point to one card. A query result record may not exist unless it points to an existing card.

Figure 5:
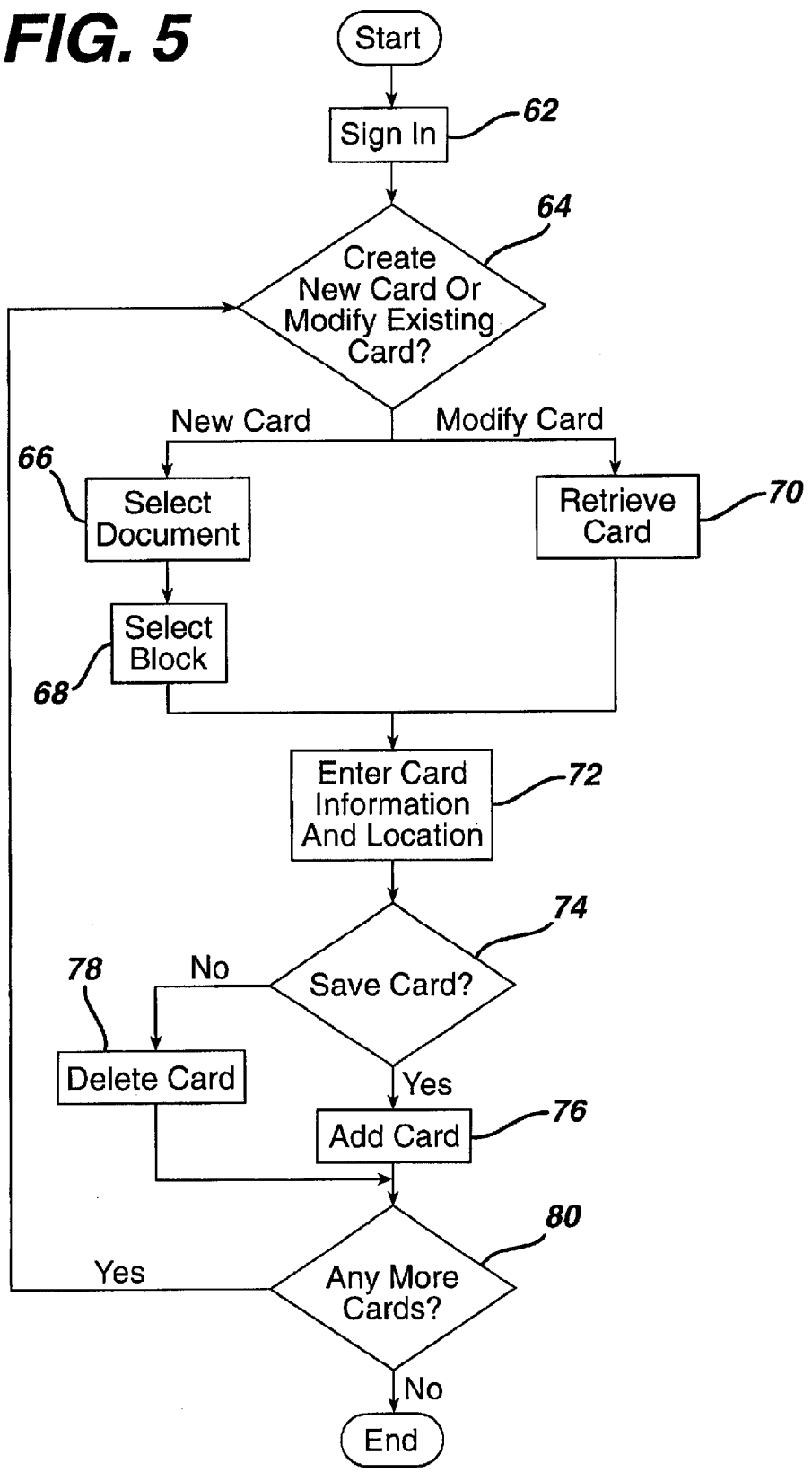
FIG. 5 shows a flow chart describing acts performed during the software card generation module shown in FIG. 2.

FIG. 5 shows a flow chart describing acts performed during the software card generation module shown in FIG. 2. At block 62, the trainer or author of the software card signs in. The sign in act can include entering identity and security information (e.g., a valid username and password). As previously mentioned, the user information database 34 contains identity and security information for users of the system 28. Furthermore, the user information database 34 may have an access control mechanism that allows users (e.g., administrators, field engineers, operators, external customers, document writers, authors, trainers, etc.) to have different roles in accessing the system 28. For example, the software card generation module can be made accessible only to document writers, authors, trainers, and off limits to other users. This set up ensures that only a specific group can create, modify or delete software cards.

A user continues with the software card generation module once access control and authentication has been completed. First, the user selects the software card generation module from the main menu of the software card application. At 64, the user decides whether he or she wants to create a new card or modify an existing card. If the user wants to create a new card, then he or she selects a document at 66 to write a software card for. Next, the user selects a block within the document that the software card should cover at 68. On the other hand, if the user wants to modify an existing card, then the user retrieves the card at 70. After selecting the block or retrieving the card, the user then enters the card information and the location information at 72. The card information may include items such as the modality (i.e., the particular type of scanner), the product line (e.g., scanner PQ), the skill level of the user (e.g., novice, intermediate, expert), the primary purpose of the information contained in the block, the secondary purpose of the information contained in the block, and any keywords. The location of the documentation referenced in the card may comprise a uniform resource locator (URL) containing the address of the document, a compact disc or a disk containing the document, or the physical location of the document.

After entering the card information and document location information, the user decides at 74 whether to save the card. If so, then the card is added to the software card database at 76. If not, then the card is deleted at 78. The user then decides if he or she wants to create any more new cards or modify any existing cards at 80. If so, then the blocks 64–80 are repeated until the user decides to end the module. The user can then go to another module or logoff from the system 28.

Figure 6:
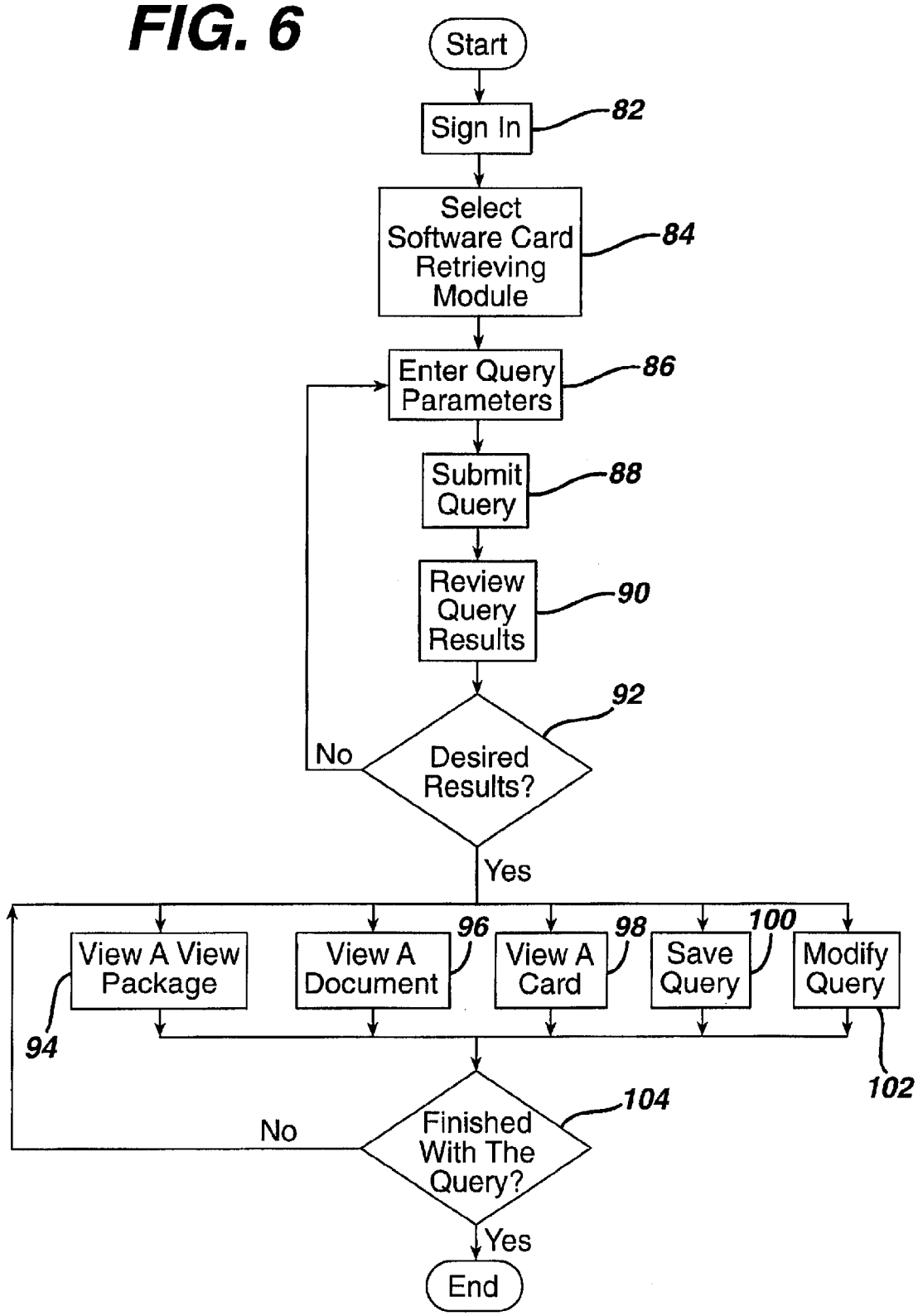
FIG. 6 shows a flow chart describing acts performed during the software card retrieving module shown in FIG. 2.

FIG. 6 shows a flow chart describing acts performed during the software card retrieving module shown in FIG. 2. At block 82, a user (e.g., administrator, field engineer, operator, external customer, document writer, author, trainer) signs into the system. After selecting the software card retrieving module at 84, the user then enters the query parameters at 86. The query parameters may include the modality (i.e., the particular type of scanner), the product line (e.g., scanner PQ), the skill level of the user (e.g., novice, intermediate, expert), the primary purpose of the information contained in the block, the secondary purpose of the information contained in the block, the document category, the type of block referenced and any keywords. The user then submits the query at 88 and waits to review the results at 90. If the results are not satisfactory as determined at 92, then the user modifies the query and blocks 86–92 are repeated until desired results are obtained.

Once satisfactory query results have been obtained, then the user has several options to choose from. In particular, the user can view a specific view package listed in the returned query results at 94, view a specific document and associated blocks listed in the query results at 96 using Adobe ACROBAT READER for PDF pages and a web browser such as Microsoft INTERNET EXPLORER or Netscape NAVIGATOR for HTML pages, view a specific card listed in the results at 98, save the query for future use at 100 or modify the query at 102. A user such as a trainer, author, or document writer that has access to the view packages may have the option to modify the software card or view packages. The user can continue with any one of these options until the user finishes with the query as determined at 104.

Figure 7:
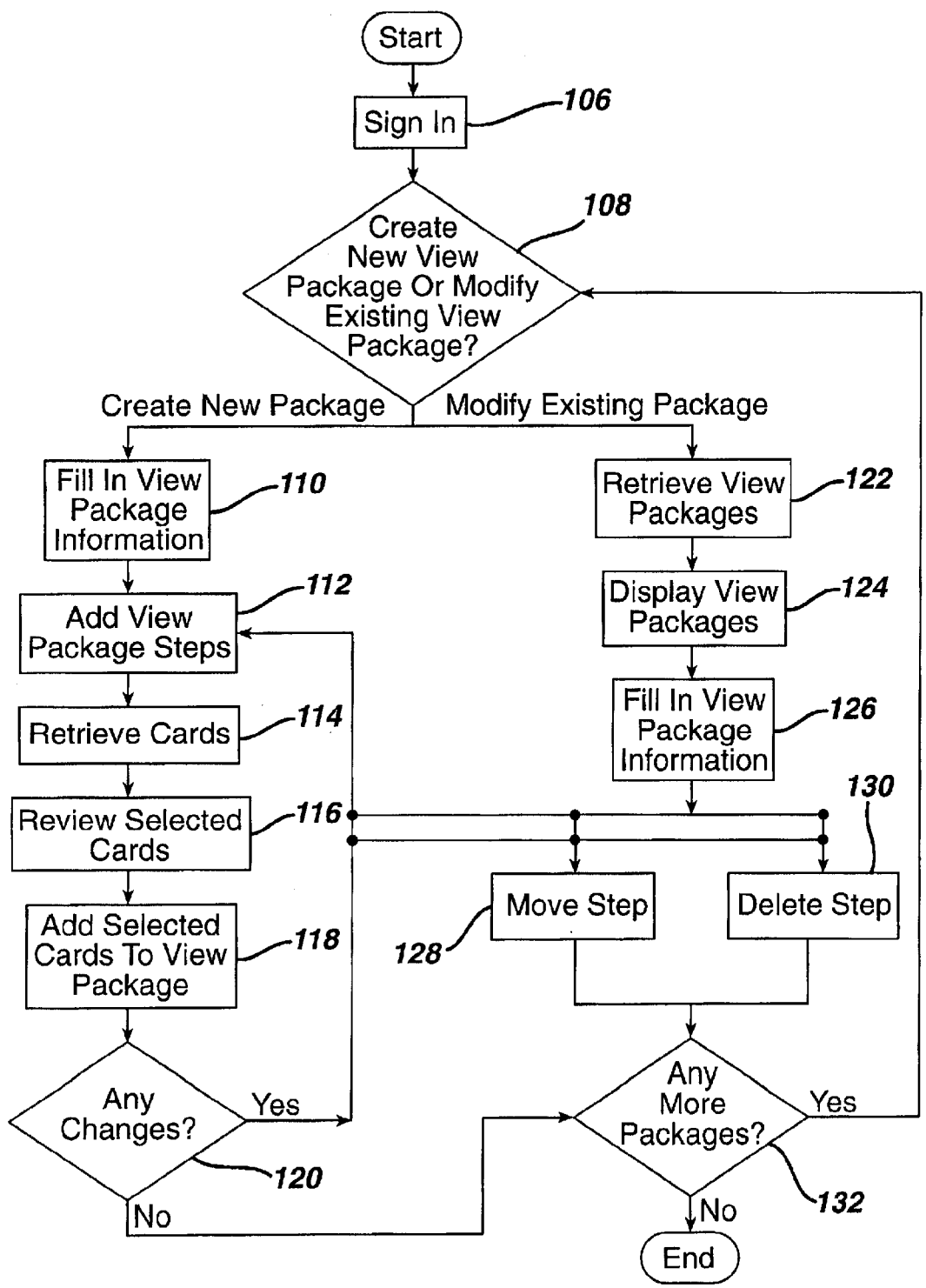
FIG. 7 shows a flow chart describing acts performed during the view package building module shown in FIG. 2.

FIG. 7 shows a flow chart describing acts performed during the view package building module shown in FIG. 2. At block 106, a user signs in and selects the view package builder module. Typically, only limited access will be given to the view package builder module so that only select parties can make changes to the view packages or create new ones. As mentioned earlier, document writers, authors, and trainers will have access to the view package builder module, while it will be off limits to other users. At 108, the user decides whether he or she wants to create a new view package or modify an existing package. If the user wants to create a new view package, then he or she fills in specific view package information at 110. The view package information may comprise the particular name to be assigned to the package, any comments, the skill level of the person (e.g., novice, intermediate, expert) that the package was written for, and any security information. This list of information is illustrative and not exhaustive of the type of information that may be used.

At 112, the user adds the view package steps that will comprise the package. Each step contains a name of the step and the blocks of information that are applicable to the step. Next, the software cards that pertain to the blocks are retrieved at 114 and reviewed at 116. All of the selected cards are then added to the newly created view package at 118. Next, the user decides at 120 whether any changes are needed to the view package. If changes are desired, then the user can add more steps and blocks 112–120 are repeated. Other options are to change the order of the steps by moving them at 128 or to delete the steps at 130. If there are no more changes as decided at 120, then the user decides at 132 whether to create any more view packages. If the user wants to create more view packages, then blocks 110-120 are repeated until no more view packages are desired.

Modifying existing view packages necessitates other actions. At 122, the desired view packages are retrieved and displayed at 124. The user then edits the view package information as desired at 126. The user then has the option to add other package steps at 112, move steps at 128 or delete steps at 130. If there are more packages to modify as determined at 132, then blocks 122–130 are repeated until there are no more. The user can then go to another module or logoff from the system.

Figure 8:
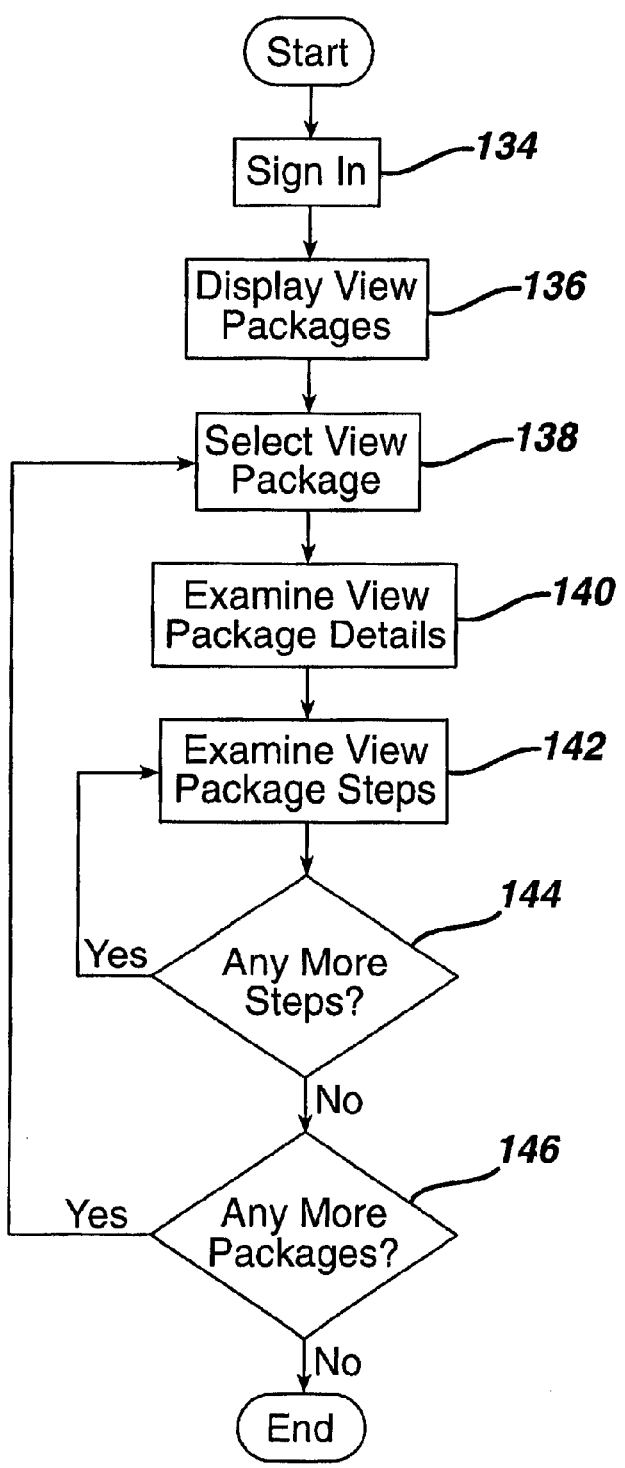
FIG. 8 shows a flow chart describing acts performed during the view package viewing module shown in FIG. 2.

FIG. 8 shows a flow chart describing acts performed during the view package viewing module shown in FIG. 2. At block 134, a user signs in and selects the view package viewing module. The module displays the view packages to the user at 136 and he or she selects a specific view package at 138. Once the user has selected a specific view package, the details of the package are displayed so that the user may examine it at 140. The user views the package steps that comprise the package at 142. If there are more steps to examine as determined at 144, then the user continues examining additional steps until he or she is finished. If there are more packages to view as decided at 146, then blocks 138–144 are repeated until there are no more or until the user decides that he or she is finished. The user can then go to another module or logoff from the system.

Figure 9:
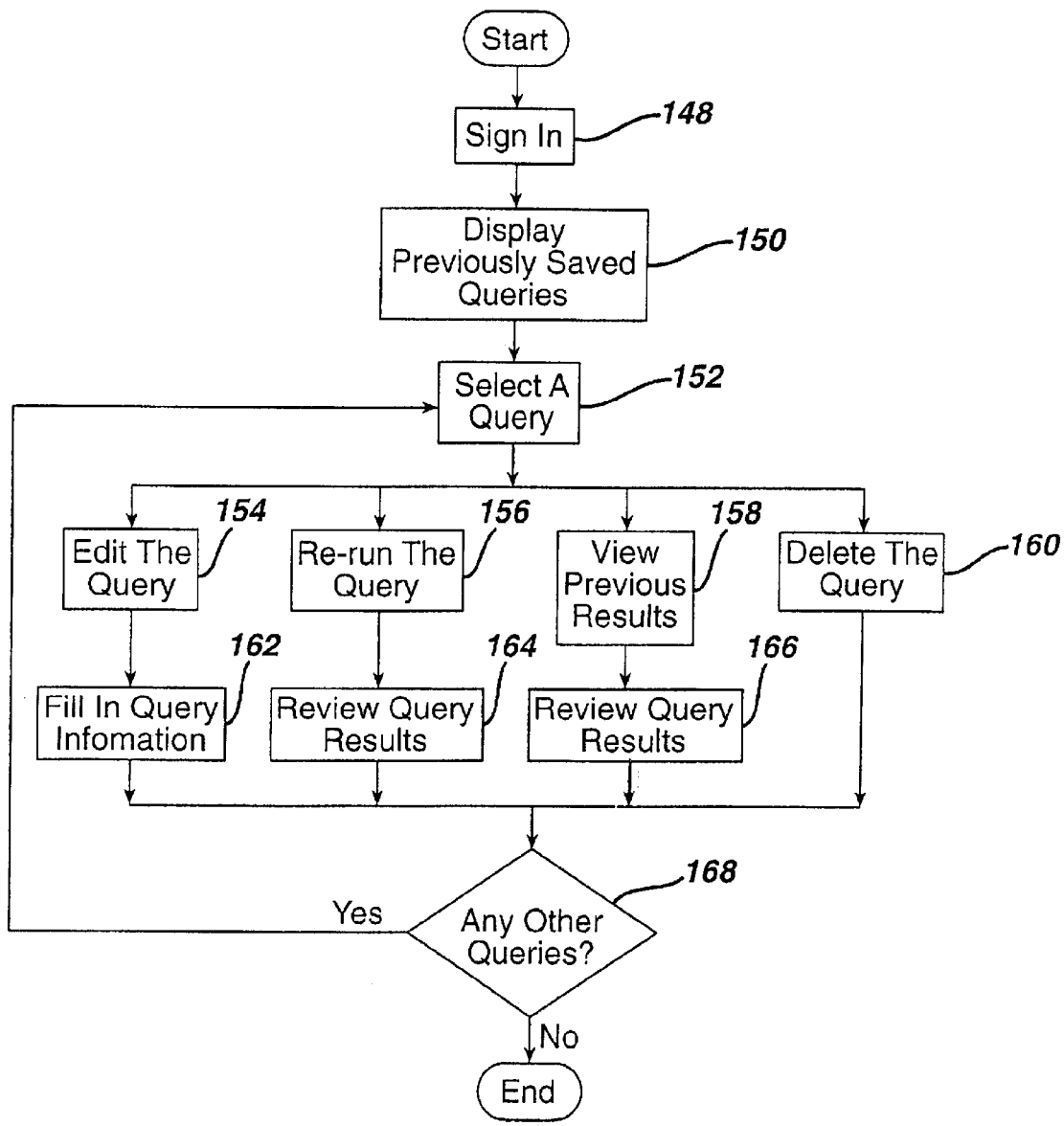
FIG. 9 shows a flow chart describing acts performed during the retrieval results viewing module shown in FIG. 2.

FIG. 9 shows a flow chart describing acts performed during the retrieval results viewing module shown in FIG. 2. At block 148, a user signs in and selects the retrieval results viewing module. The module displays previously saved queries to the user at 150. The user then selects one of the previously saved queries for further review at 152. The user has the option of editing the query at 154, re-running the query at 156, viewing the previously saved results from the query at 158 or deleting the query at 160. If the user wants to edit the query, then he or she fills in the query information at 162. The query information may comprise information such as modality (i.e., the particular type of scanner), the product line (e.g., scanner PQ), the skill level of the user (e.g., novice, intermediate, expert), the primary purpose of the information searched for, the secondary purpose of the information search for, document category, the type of block referenced and any keywords. If the user re-runs the query, then he or she can review the query results at 164. Also, the user will have the option to review the query results at 166 if he or she wants to view the previously saved query results. Blocks 152–166 are repeated until the user decides at 168 that he or she does not want to select any more previously saved queries.

The foregoing flow charts of this disclosure show the functionality and operation of a possible implementation of the system and method for generating software cards that summarize and index information. In this regard, each block represents a module, segment, or portion of code, which comprises one or more executable instructions for implementing the specified logical function(s). It should also be noted that in some alternative implementations, the functions noted in the blocks may occur out of the order noted in the figures, or for example, may in fact be executed substantially concurrently or in the reverse order, depending upon the functionality involved. Furthermore, the functions can be implemented in programming languages such as C++ or JAVA, however, other languages can be used.

Figure 10A:
FIGS. 10a–10n show various screen displays that may be presented to a user of the system shown in FIG. 2.
Figure 10B:
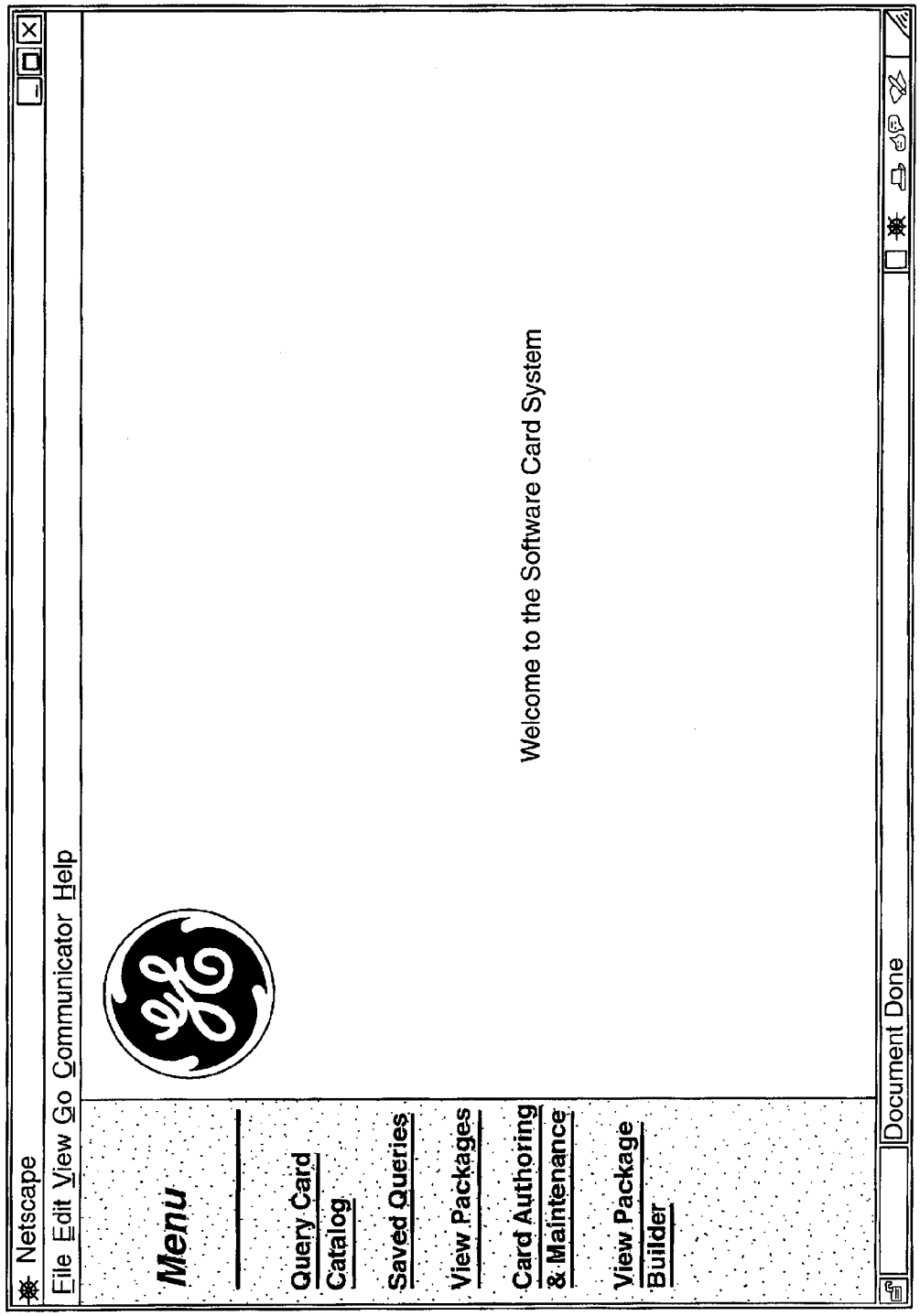
Figure 10C:
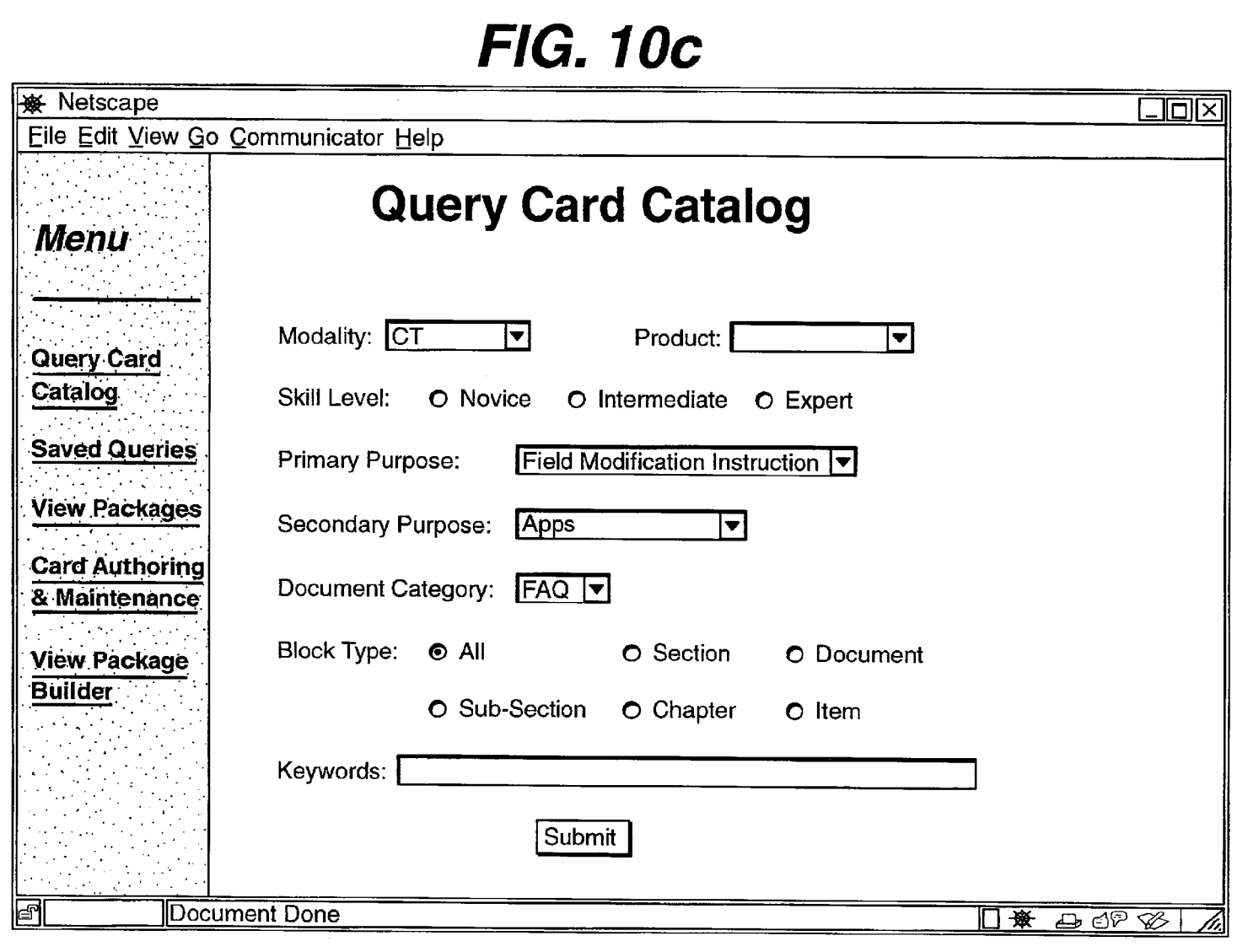
Figure 10D:
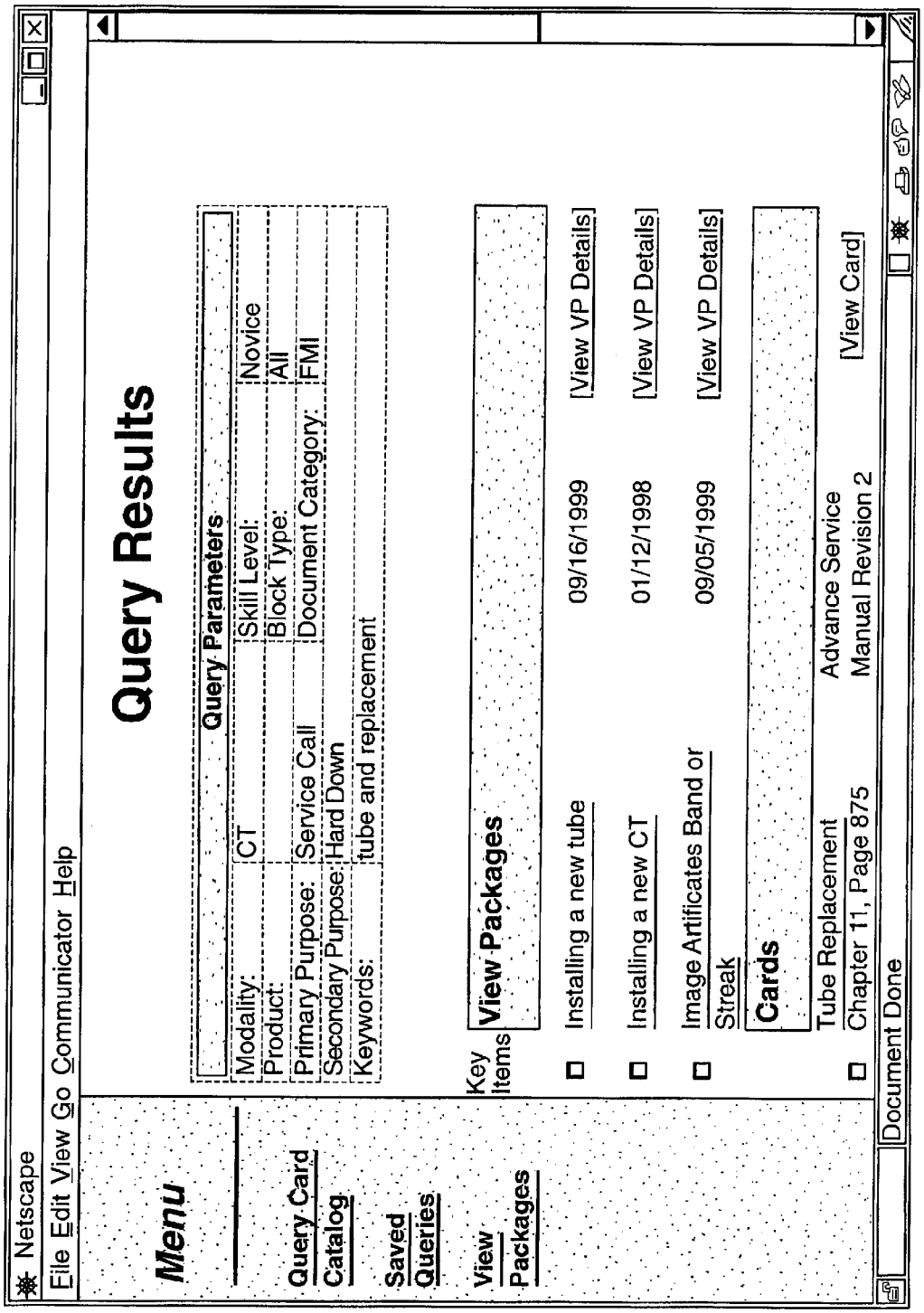
Figure 10E:
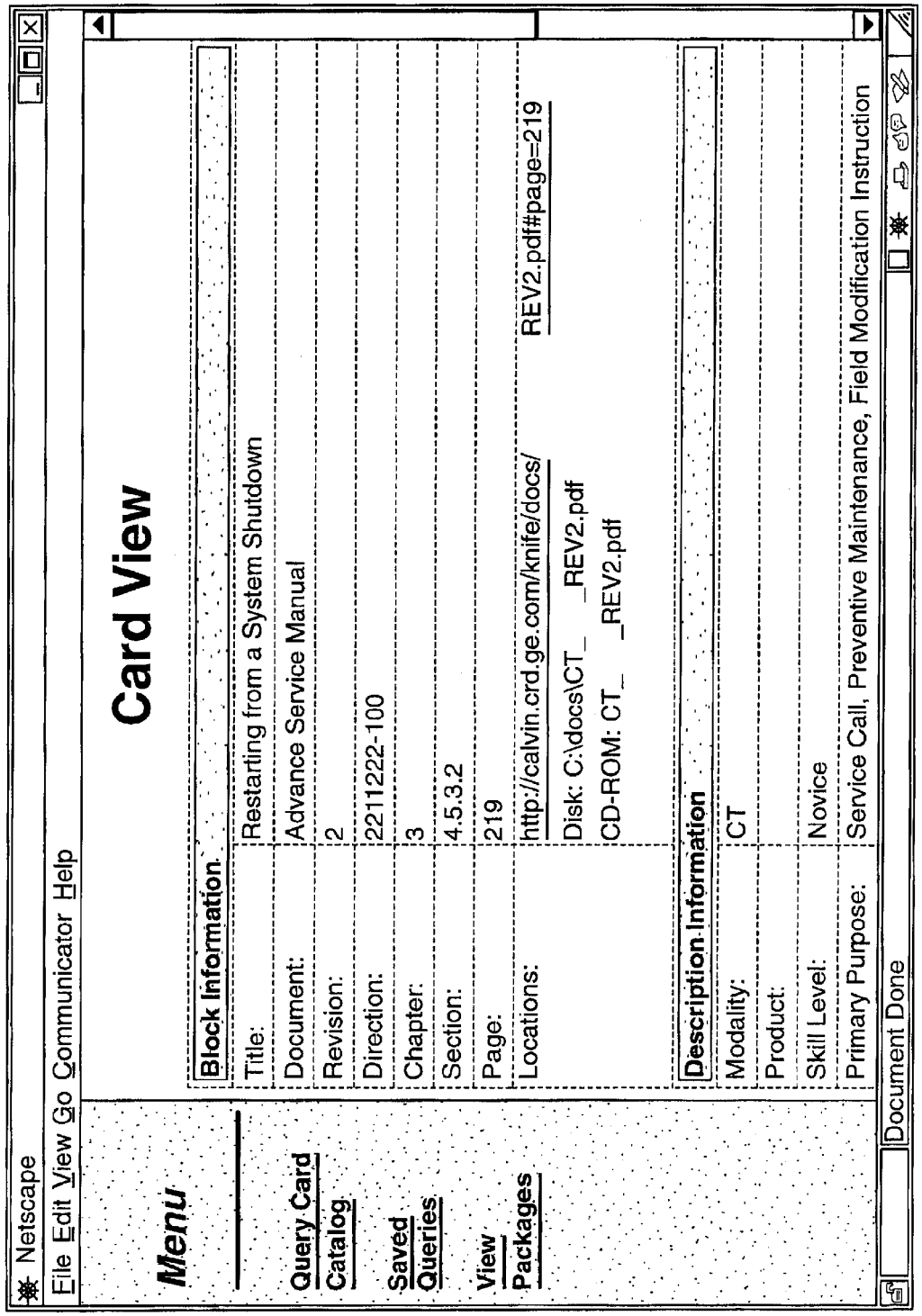
Figure 10F:
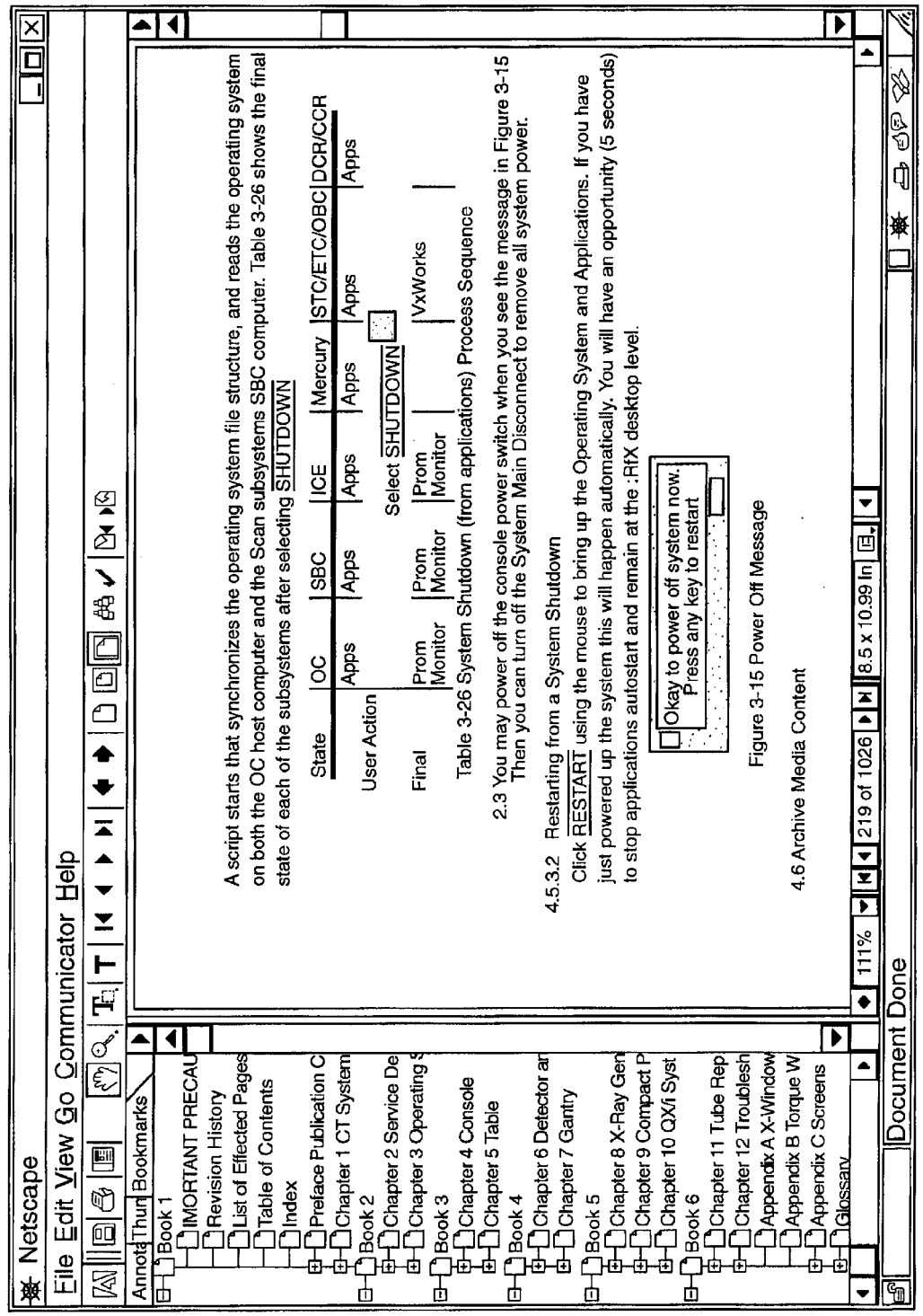
Figure 10G:
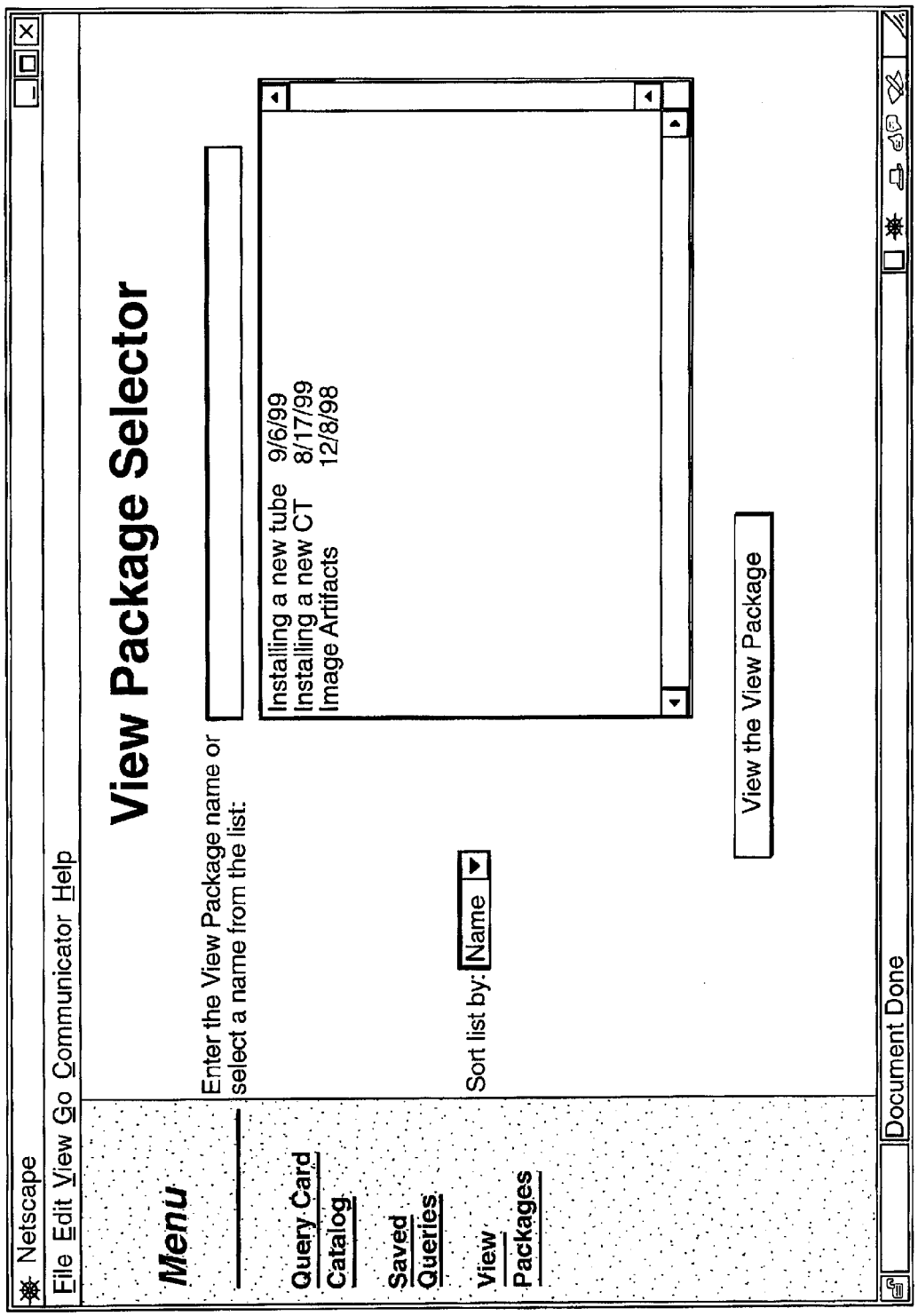
Figure 10H:
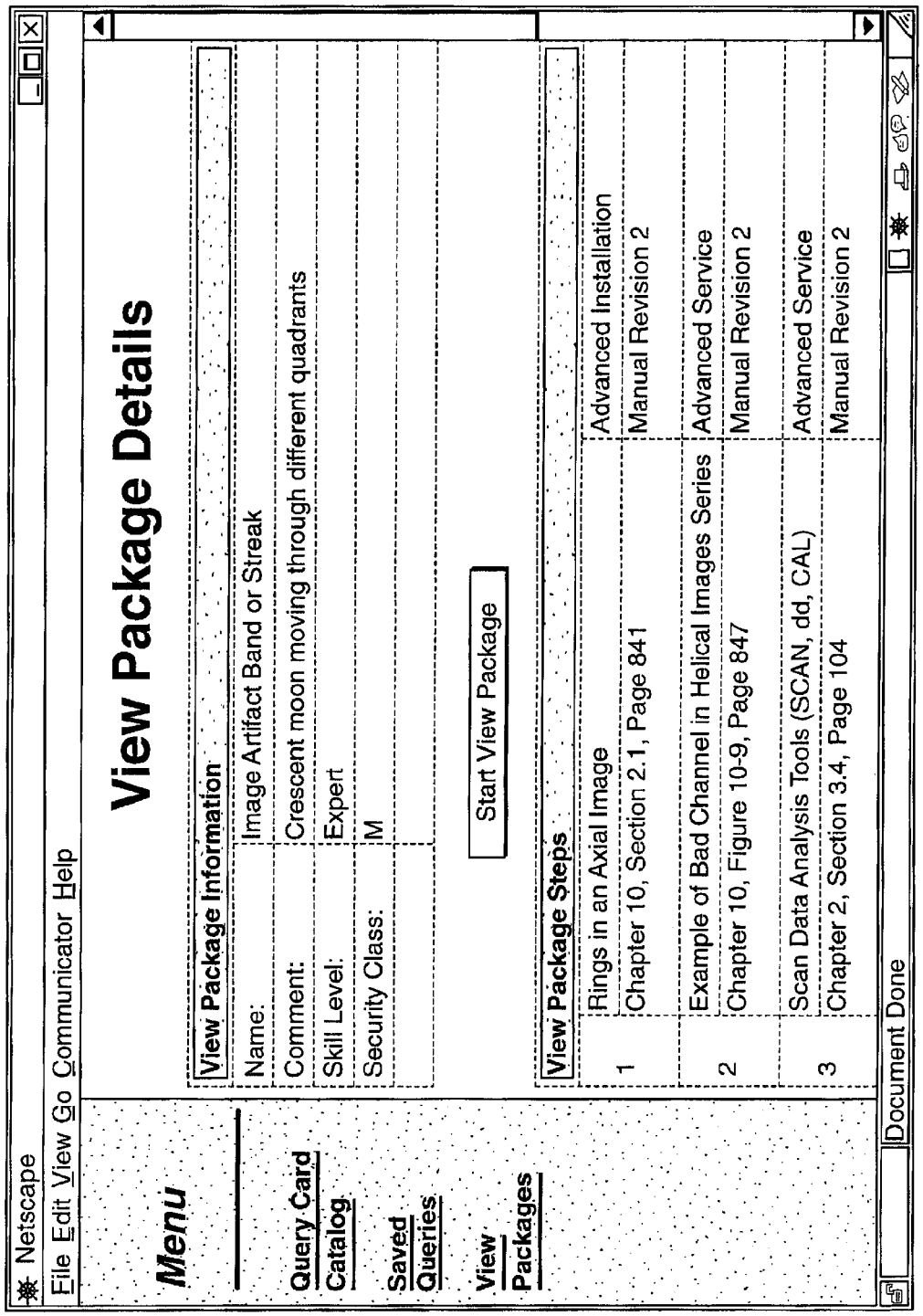
Figure 10I:
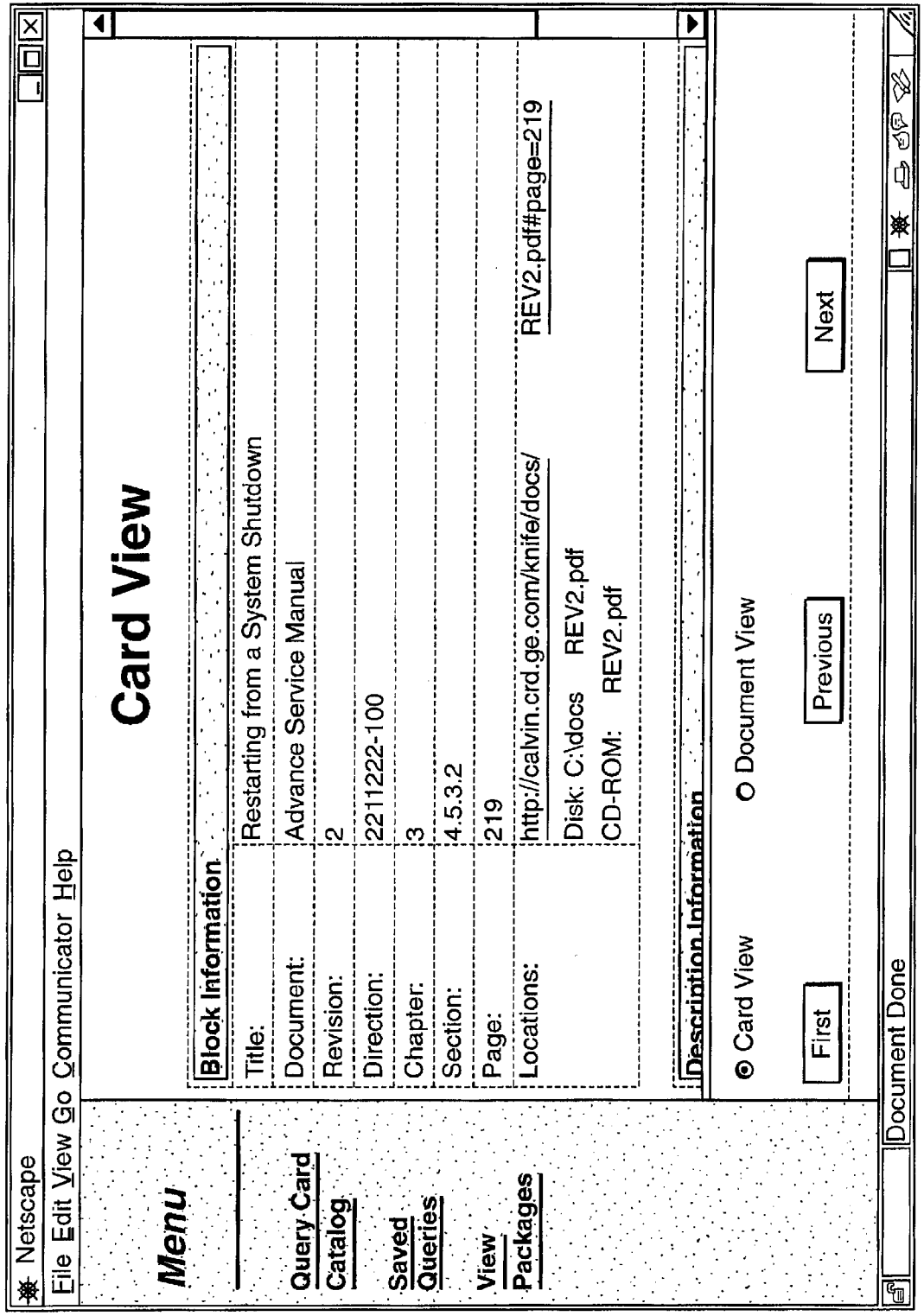
Figure 10J:
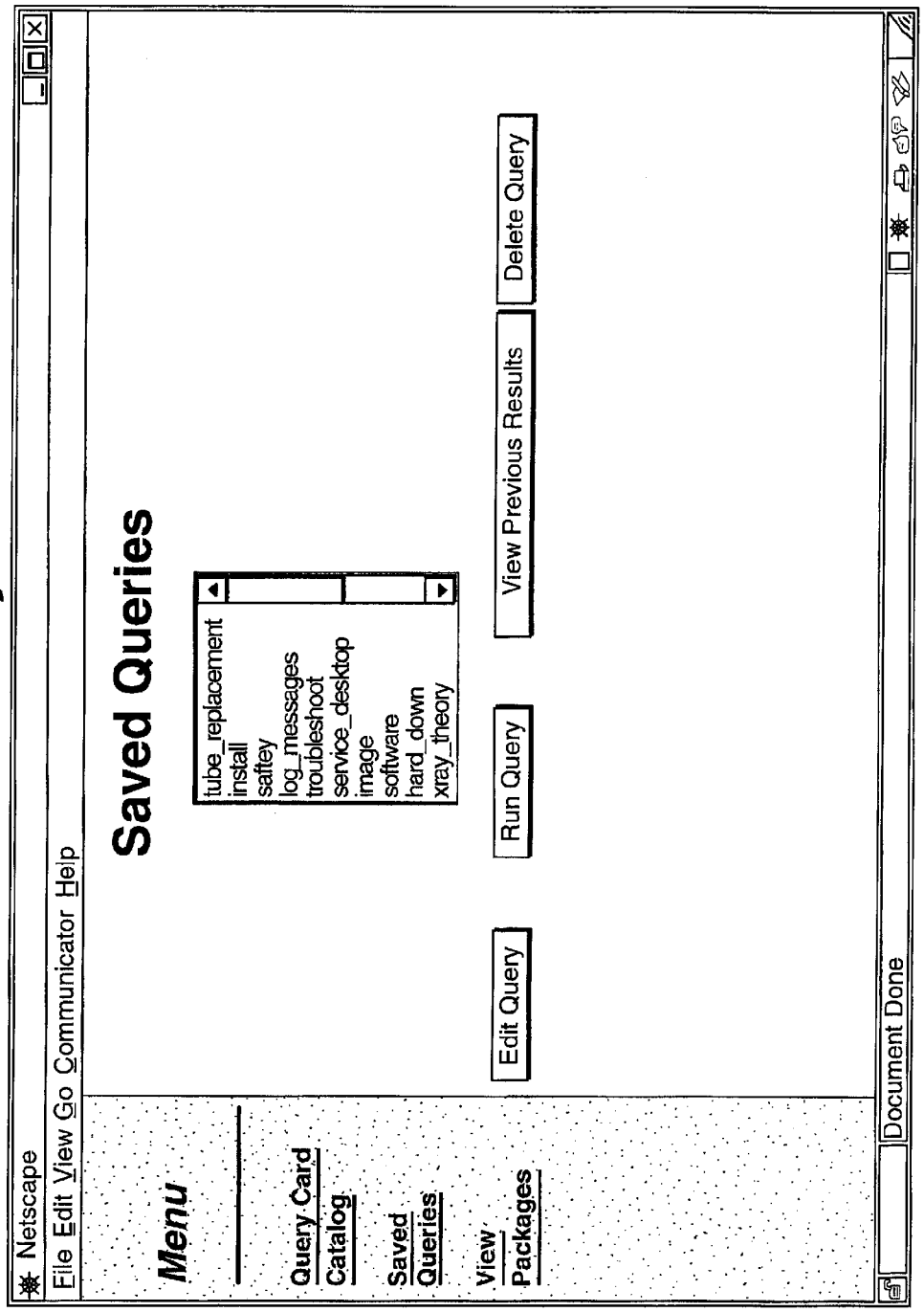
Figure 10K:
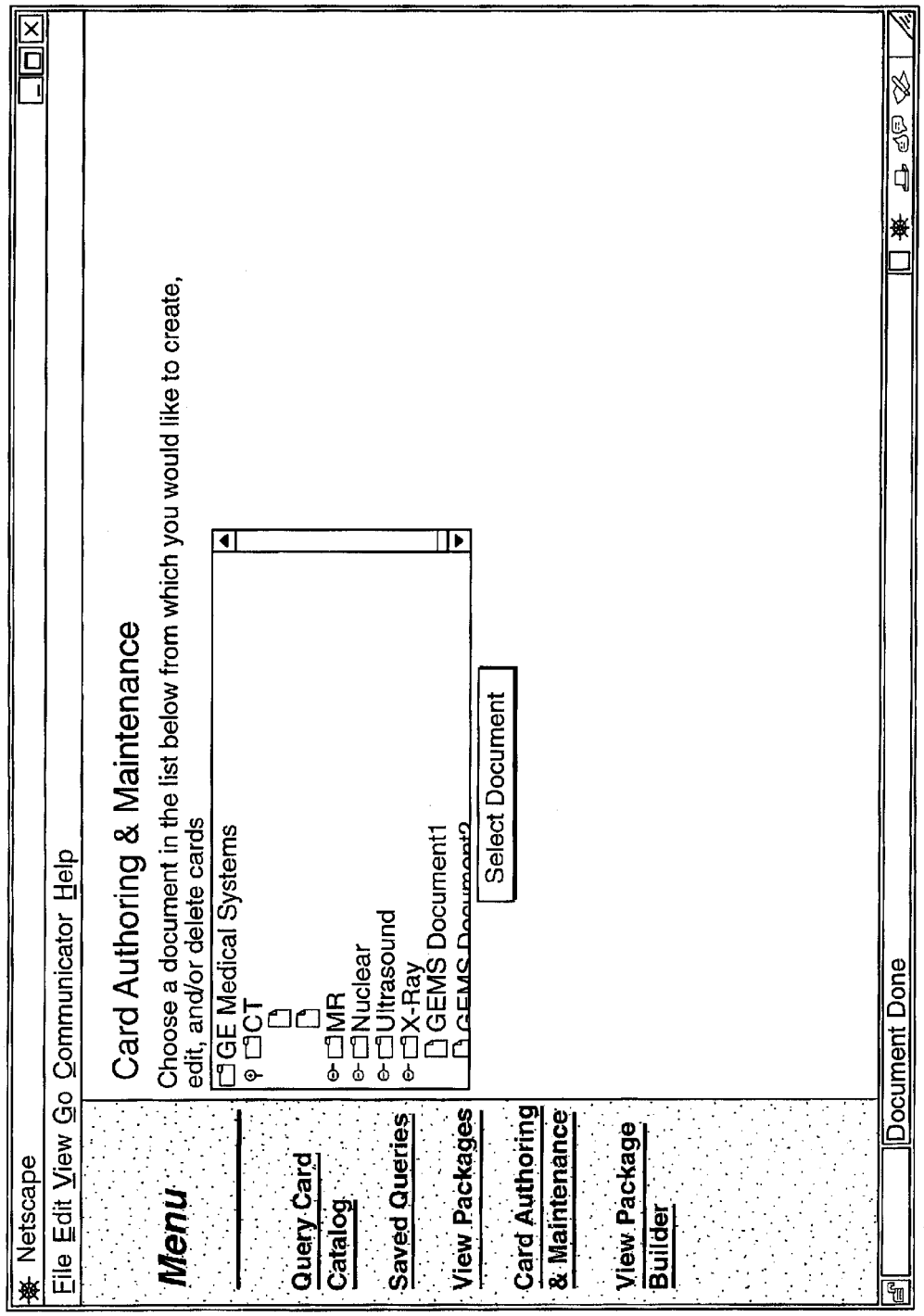
Figure 10I:
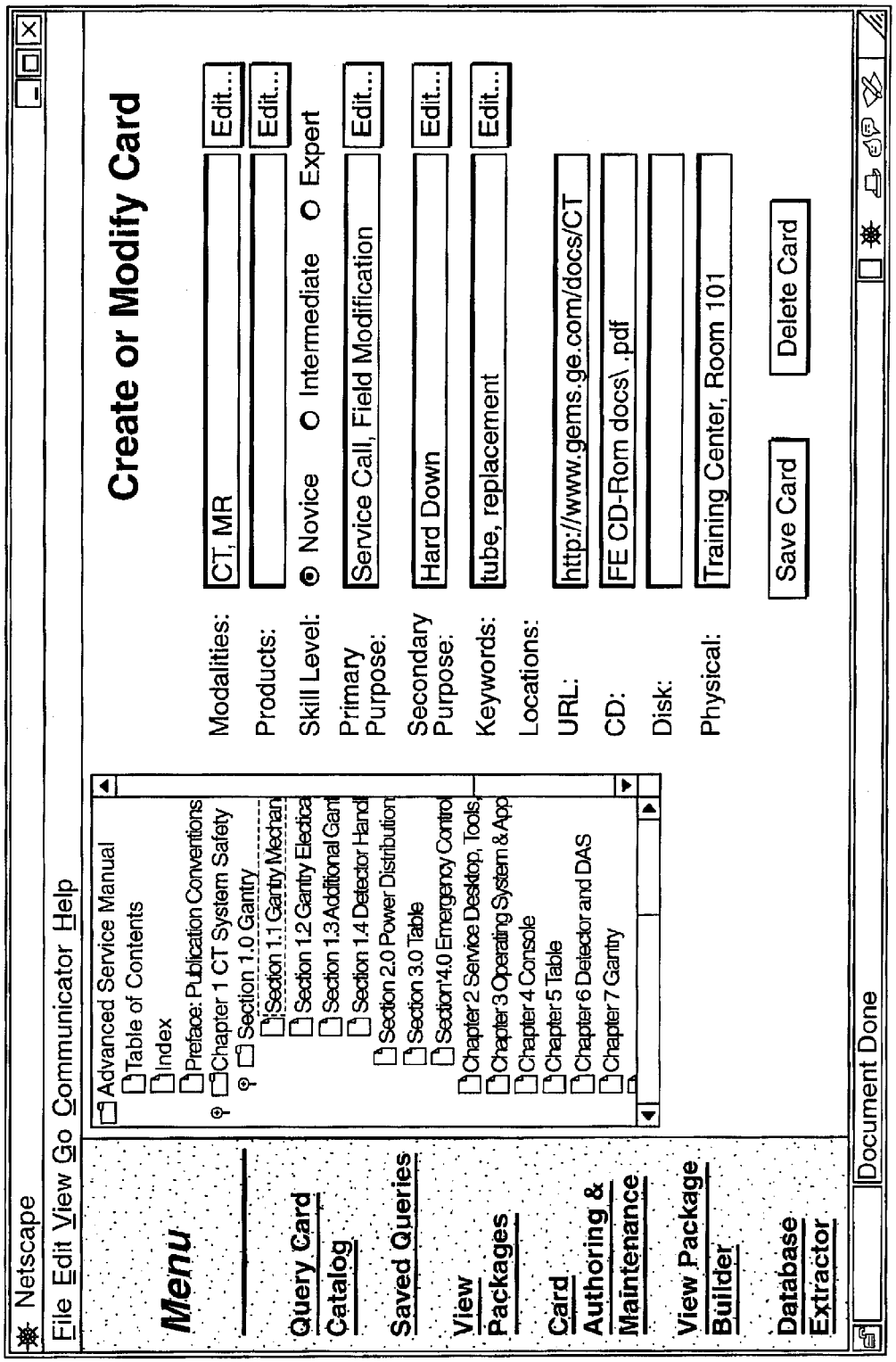
Figure 10M:
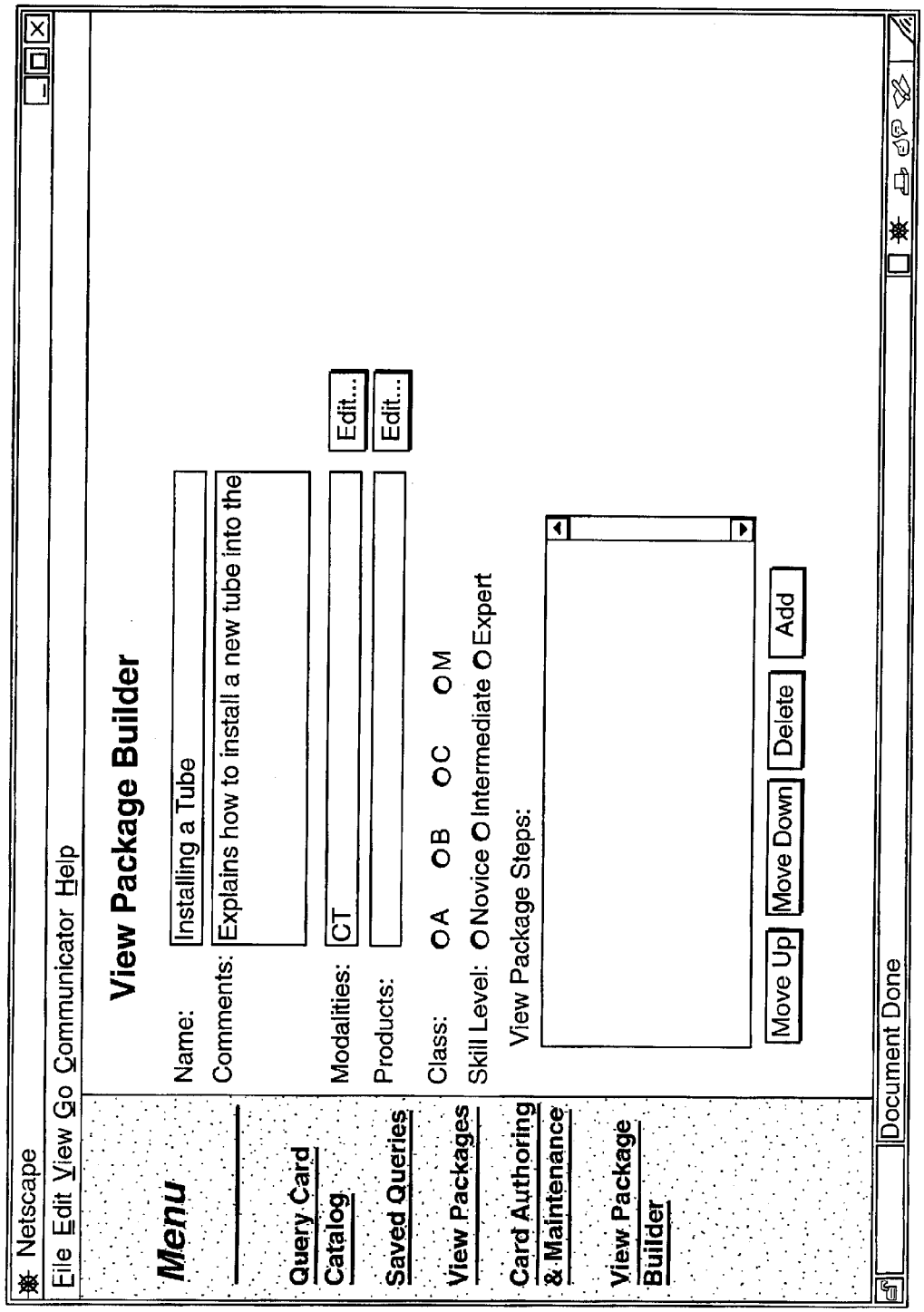
Figure 10N:
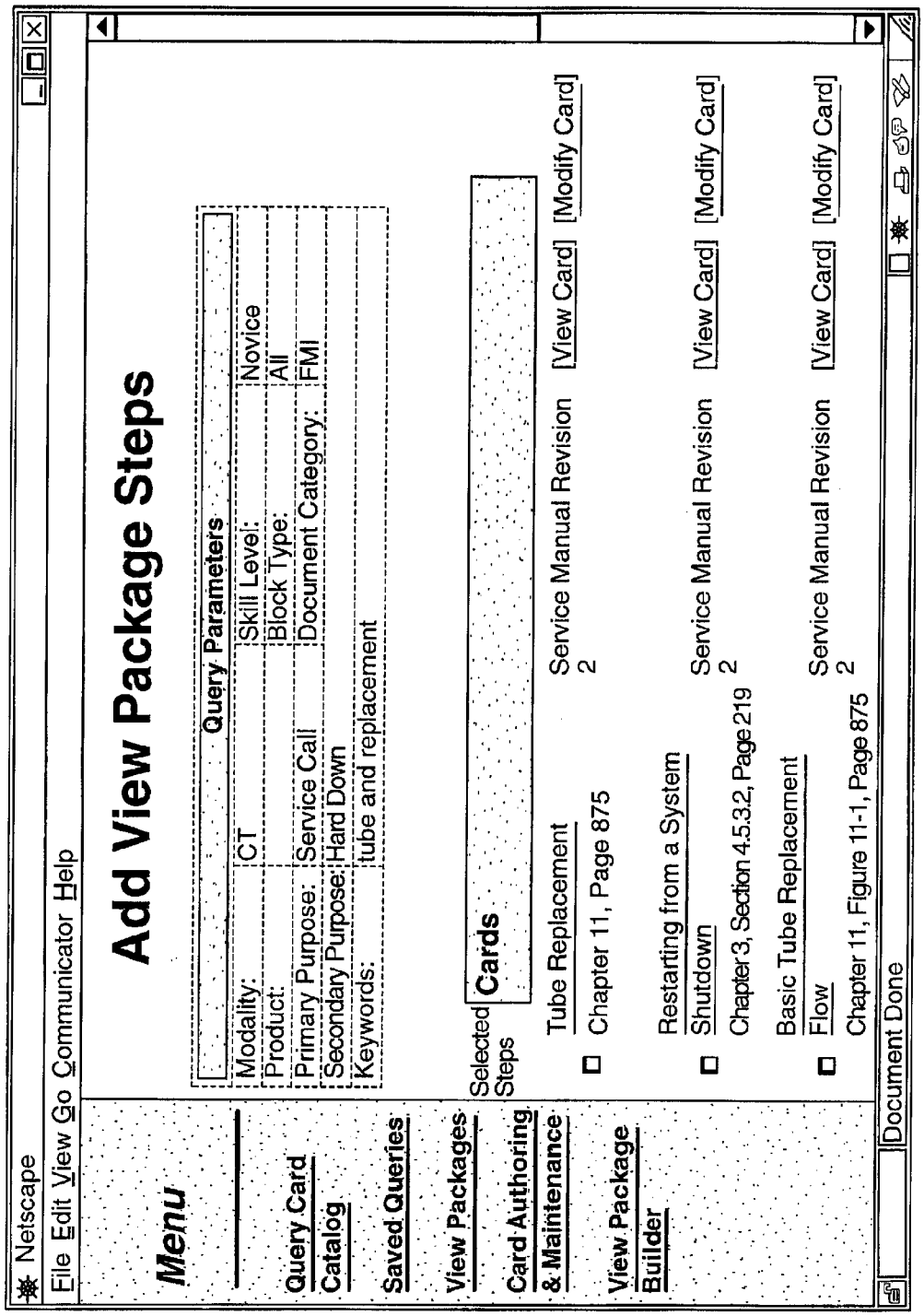

FIGS. 10a–10n show various screen displays that may be presented to a user of the system shown in FIG. 2. These screen displays are for illustrative purposes only and are not exhaustive of other types of displays. Also, the actual look and feel of the displays can be slightly changed during implementation. FIGS. 10a–10b show screen displays that may be presented to a user after he or she logs into the system 28. On the left hand side of the screen displays is a menu that contains options available to the user based on their access privileges. For example, the screen display in FIG. 10a is for end-users (e.g., field service personnel, operators, external customers, etc.) while the screen display in FIG. 10b is for authors such as trainers and document writers.

When a user chooses "Query Card Catalog" from the main menu, he or she is presented with a screen display as shown in FIG. 10c. This display presents a plurality of query parameters to the user for filling in. As mentioned above, the query parameters may comprise parameters such as the modality (i.e., the particular type of scanner), the product line (e.g., scanner PQ), the skill level of the user (e.g., novice, intermediate, expert), the primary purpose of the information contained in the block, the secondary purpose of the information contained in the block, the document category, the type of block referenced and any keywords. After completing the entry of the parameters, the user presses the "Submit" button. The results of the query are displayed to the user on a screen such as the one shown in FIG. 10d. The top of the query results as shown in FIG. 10d comprise the parameters of the query followed by a list of the view packages and a list of the cards that match the query. From this screen the user can open a specific view package, view the details of a view package, open a specific block in a document, or view the details of the card that points to that block. If the user is a card or view package author, they will also be given the option to modify the card or view the package. If users scroll to the bottom of this screen, they have the option to view the next page of results, save the query for later use, or modify and rerun the query.

FIG. 10e shows a screen display on which a user views the details of a software card. If the block of information to which the card points to is available electronically, then the user can view that information with a web browser. If the information is a PDF document, then the user can use Adobe ACROBAT READER to open and read the document. An example is shown in FIG. 10f.

If the user desires to exit the Query Card Catalog selection and go to another then he or she goes back to the main menu. FIG. 10g shows a screen display presented to a user after selecting "View Packages". Once the user has selected a view package, the screen displays the details of that view package as shown in FIG. 10h. From this screen the user can start the selected view package. Upon starting the view package, the screen is divided into a viewing area at the top and a navigation bar at the bottom as shown in FIG. 10i. The navigation bar allows the user to move step-by-step through the view package. The viewing area displays details of the card in each step, the actual document information to which the card points, or the card history (e.g., author of card, date card was created, last person to modify the card, and the date of the last modification). The user can use the toggle buttons on the navigation bar to easily switch between the card view and document view.

Returning again to the main menu, the user has the option of viewing previously saved queries. When this option is selected, a screen display as shown in FIG. 10j, allows the user to select a previously saved query. After selecting a previously saved query, the user has the option of editing this query, running it to receive the most updated results, viewing the results from the last time it was saved, or deleting the query.

The previously mentioned screen displays are accessible by end users such as field service personnel, operators and external customers, while privileged users, such as authors, trainers, document writers or administrators, may have access to additional screens. For example, a card author may select "Card Authoring & Maintenance" from the main menu which opens the screen pictured in FIG. 10k. Here the author chooses the document from which they will author cards. It may be assumed from this interface that the document and block information already exists in the software card database 32 as a result of some automated off-line processing of the document. This means that the document, chapter, and section information for the blocks exists in the software card database 32. The job of the card author is to create or author cards that point to and describe the pre-existing blocks of information.

Once the document is selected, the screen for creating and editing these cards is shown in FIG. 10l. Alternatively, it may be possible for an author to reach this screen by selecting a "Modify Card" option on their query results screen. An author selects a block from the scrolling list on the left. Next he or she fills in the necessary card information in the fields on the right (e,g., modalities, products, level of expertise). Once an author saves the card, it will automatically highlight the next block in the list and allow the author to create a card for that block. This facilitates fast and easy entry of cards into the system.

View package authors also have a "View Package Builder" option in their menu. Selecting this option presents a screen display such as the one shown in FIG. 10m. From this screen the authors can fill in the properties of the view package. Under the "Class" field, the only options available to the author will be the options that are equal or more secure than the most secure step of the view package. In other words, the author can make the view package more secure than the security of the individual steps, but they cannot make it less secure. When the author clicks the add button to add steps to the view package, they are presented with the query screen pictured earlier in FIG. 10c. Upon running the query, the results are displayed as in FIG. 10n. The author selects the cards to be added to the view package and then is returned to FIG. 10m where they may reorder the steps as necessary.

The above-described system for generating software cards that summarize and index information comprises an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

It is apparent that there has been provided in accordance with this invention, a system, method, and computer product for generating software cards that summarize and index information. While the invention has been particularly shown and described in conjunction with a preferred embodiment thereof, it will be appreciated that variations and modifications can be effected by a person of ordinary skill in the art without departing from the scope of the invention.

What is claimed is:

1. A system for generating a plurality of software cards from information contained in a plurality of documentation that are used to facilitate training of personnel in servicing a machine, comprising:
    a documentation storage unit that stores the plurality of documentation which relates to at least one of training the personnel and servicing the machine;
    a software card generator that generates each of the plurality of software cards for a predetermined card category that relates to servicing the machine, wherein each software card points to blocks of information stored in the documentation storage unit that relate to the predetermined card category and wherein each software card provides a collection of specifically defined attributes that describe information used to train personnel in servicing the machine and its location within the documentation storage unit, wherein the collection of specifically defined attributes are categorized and ordered in a hierarchical manner for facilitating the training of personnel in servicing the machines; and
    a software card database that stores the generated plurality of software cards.

2. The system according to claim 1, wherein the software card generator comprises a software card maintainer that modifies and deletes selected software cards stored in the software card database.

3. The system according to claim 1, further comprising a software card retriever that queries the software card database to find each of the plurality of software cards stored in the software card database.

4. The system according to claim 3, wherein the software card retriever returns software cards classified according to a specific category in a logical sequence of order for servicing a machine.

5. The system according to claim 1, further comprising a block viewer that enables viewing of the blocks of information pointed to by each of the plurality of software cards.

6. The system according to claim 1, further comprising a view package builder that packages the plurality of software cards in a predetermined order.

7. The system according to claim 6, further comprising a view package viewer that enables the viewing of the software card packages.

8. The system according to claim 1, further comprising a retrieval results viewer that enables the viewing of previously saved queries and results.

9. A system for generating a plurality of software cards from information contained in a plurality of documentation that are used to facilitate training of personnel in servicing a machine, comprising:
    means for storing the plurality of documentation which relates to at least one of training the personnel and servicing the machine;
    means for generating each of the plurality of software cards for a predetermined card category that relates to servicing the machine, wherein each software card points to blocks Of information stored in the documentation storing means that relate to the predetermined card category and wherein each software card provides a collection of specifically defined attributes that describe information used to train personnel in servicing the machine and its location within the documentation storage unit, wherein the collection of specifically defined attributes are categorized and ordered in a hierarchical manner for facilitating the training of personnel in servicing the machine; and
    means for storing the generated plurality of software cards.

10. The system according to claim 9, wherein the generating means comprises means for modifying and deleting selected software cards stored in the software card storing means.

11. The system according to claim 9, further comprising means for querying the software card storing means to find each of the plurality of software cards stored in the software card storing means.

12. The system according to claim 11, wherein the querying means returns software cards classified according to a specific category in a logical sequence of order for servicing the machine.

13. The system according to claim 9, further comprising means for viewing of the blocks of information pointed to by each of the plurality of software cards.

14. The system according to claim 9, further comprising means for packaging the plurality of software cards in a predetermined order.

15. The system according to claim 14, further comprising means for viewing the software card packages.

16. The system according to claim 9, further comprising means for viewing previously saved queries and results.

17. A system for structuring information contained in a plurality of documentation into a plurality of software cards that are used to facilitate training of personnel in servicing a machine, comprising:
    a documentation storage unit that stores the plurality of documentation which relates to at least one of training the personnel and servicing the machine;

a software card generator that generates each of the plurality of software cards for a predetermined card category that relates to servicing the machine, wherein each software card points to blocks of information stored in the documentation storage unit that relate to the predetermined card category and that describe information used to train personnel in servicing the machine and Its location within the documentation storage unit, wherein the collection of specifically defined attributes are categorized and ordered in a hierarchical manner for facilitating the training of personnel in servicing the machine;

a software card database that stores the generated plurality of software cards;

a software card retriever that queries the software card database to find each of the plurality of software cards stored in the software card database;

a retrieval results viewer that enables the viewing of previously saved queries and results; and a block viewer that enables viewing of the blocks of information pointed to by each of the plurality of software cards.

18. The system according to claim 17, wherein the software card generator comprises a software card maintainer that modifies and deletes selected software cards stored in the software card database.

19. The system according to claim 17, wherein the software card retriever returns software cards classified according to a specific category in a logical sequence of order for servicing the machine.

20. The system according to claim 17, further comprising a view package builder that packages the plurality of software cards in a predetermined order.

21. The system according to claim 20, further comprising a view package viewer that enables the viewing of the software card packages.

22. A system for managing a plurality of documentation used to facilitate training of personnel in servicing a machine, comprising:

a documentation storage unit that stores the plurality of documentation which relates to at least one of training the personnel and servicing the machine;

a software card database that stores a plurality of software cards, wherein each software card points to blocks of information stored in the documentation storage unit that relate to a predetermined card category, wherein each software card provides a collection of specifically defined attributes that describe information used to train personnel in servicing the machine and its location within the documentation storage unit, wherein the collection of specifically defined attributes are categorized and ordered in a hierarchical manner for facilitating the training of personnel in servicing the machine;

a software card application that structures the plurality of documentation stored in the documentation storage unit in accordance with the plurality of software cards stored in the software card database; and a first computing unit configured to execute the software card application.

23. The system according to claim 22, wherein the software card application comprises a software card generation module that generates each of the plurality of software cards for a predetermined card category that relates to servicing the machine.

24. The system according to claim 23, wherein the software card generation module comprises a software card maintenance module that modifies and deletes selected software cards stored in the software card database.

25. The system according to claim 22, wherein the software card application comprises a software card retrieving module that queries the software card database to find each of the plurality of software cards stored in the software card database.

26. The system according to claim 25, wherein the software card retrieving module returns software cards classified according to a specific category in a logical sequence of order for servicing the machine.

27. The system according to claim 22, wherein the software card application comprises a block viewing module that enables viewing of the blocks of information pointed to by each of the plurality of software cards.

28. The system according to claim 22, wherein the software card application comprises a view package building module that packages the plurality of software cards in a predetermined order.

29. The system according to claim 28, wherein the software card application comprises a view package viewing module that enables the viewing of the software card packages.

30. The system according to claim 22, wherein the software card application comprises a retrieval results viewing module that enables the viewing of previously saved queries and results.

31. The system according to claim 22, further comprising a second computing unit configured to serve the documentation storage unit, the software card database, and the software card application to the first computing unit over a network.

32. A system for managing a plurality of documentation used to facilitate training at personnel in servicing a machine, comprising:

a documentation storage unit that stores the plurality of documentation which relates to at least one of training the personnel and servicing the machine;

a software card database that stores a plurality of software cards, wherein each software card points to blocks of information stored in the documentation storage unit that relate to a predetermined card category, and wherein each software card provides a collection of specifically defined attributes that describe information used to train personnel in servicing the machine and its location within the documentation storage unit, wherein the collection of specifically defined attributes are categorized and ordered in a hierarchical manner or facilitating the training of personnel in servicing the machine;

a software card application that structures the plurality of documentation stored in the documentation storage unit in accordance with the plurality of software cards stored in the software card database;

a first computing unit configured to execute the software card application;

a network;

a second computing unit configured to serve the documentation storage unit, the software card database, and the software card application to the first computing unit.

33. The system according to claim 32, wherein the software card application comprises a software card generation module that generates each of the plurality of software cards for a predetermined card category that relates to servicing the machine.

34. The system according to claim 33, wherein the software card generation module comprises a software card maintenance module that modifies and deletes selected software cards stored in the software card database.

35. The system according to claim 32, wherein the software card application comprises a software card retrieving module that queries the software card database to find each of the plurality of software cards stored in the software card database.

36. The system according to claim 35, wherein the software card retrieving module returns software cards classified according to a specific category in a logical sequence of order for servicing the machine.

37. The system according to claim 32, wherein the software card application comprises a block viewing module that enables viewing of the blocks of information pointed to by each of the plurality of software cards.

38. The system according to claim 32, wherein the software card application comprises a retrieval results viewing module that enables the viewing of previously saved queries and results.

39. A method for generating a plurality of software cards from information contained in a plurality of documentation that are used to facilitate training of personnel in servicing a machine, comprising:

storing the plurality of documentation which relate to at least one of training the personnel and servicing the machine;

generating each of the plurality of software cards for a predetermined card category, wherein each software card points to blocks of stored documentation that relate to the predetermined card category and wherein each software card provides a collection of specifically defined attributes that describe information used to train personnel in servicing the machine and its location within the documentation storage unit, wherein the collection of specifically defined attributes are categorized and ordered in a hierarchical manner for facilitating the training of personnel in servicing the machine; and storing the generated plurality of software cards.

40. The method according to claim 39, wherein the software card generating comprises modifying and deleting selected software cards.

41. The method according to claim 39, further comprising updating each of the plurality of stored software cards as documentation information is updated.

42. The method according to claim 39, further comprising querying the stored software cards.

43. The method according to claim 42, wherein the querying returns software cards classified according to a specific category in a logical sequence of order for servicing the machine.

44. The method according to claim 39, further comprising viewing the blocks of information pointed to by each of the plurality of software cards.

45. The method according to claim 39, further comprising packaging the plurality of software cards in a predetermined order.

46. The method according to claim 45, further comprising viewing the software card packages.

47. The method according to claim 39, further comprising viewing previously saved queries and results.

48. A method for structuring information contained in a plurality of documentation into a plurality of software cards that are used to facilitate training of personnel in servicing a machine, comprising:

storing the plurality of documentation which relate to at least one of training the personnel and servicing the machine;

generating each of the plurality of software cards for a predetermined card category that relates to servicing the machine, wherein each software card points to blocks of information in the stored plurality of documentation that relate to the predetermined card category and wherein each software card provides a collection of specifically defined attributes that describe information used to train personnel in servicing the machine and its location within the documentation storage unit, wherein the collection of specifically defined attributes are categorized and ordered in a hierarchical manner for facilitating the training of personnel in servicing the machine;

storing the generated plurality of software cards;

querying the plurality of stored software cards to facilitate the training of the personnel;

viewing previously saved queries and results to facilitate the training of the personnel; and viewing the blocks of information pointed to by each of the plurality of software cards to facilitate the training of the personnel.

49. The method according to claim 48, wherein the software card generating comprises modifying and deleting selected software cards.

50. The method according to claim 48, wherein the querying returns software cards classified according to a specific category in a logical sequence of order for servicing the machine.

51. The method according to claim 48, further comprising packaging the plurality of software cards in a predetermined order.

52. The method according to claim 51, further comprising viewing the software car packages.

53. A method for managing a plurality of documentation used to facilitate training of personnel in servicing a machine, comprising:

storing the plurality of documentation which relate to at least one of training the personnel and servicing the machine;

storing a plurality of software cards, wherein each software card points to blocks of information stored in the plurality of documentation that relate to a predetermined card category and wherein each software card provides a collection of specifically defined attributes that describe information used to train personnel in servicing the machine and its location within the documentation storage unit, wherein the collection of specifically defined attributes are categorized and ordered in a hierarchical manner for facilitating the training of personnel in servicing the machine;

structuring the plurality of stored documentation in accordance with the plurality of software cards; and configuring a first computing unit to perform the structuring.

54. The method according to claim 53, wherein the structuring comprises generating each of the plurality of software cards for a predetermined card category that relates to servicing the machine.

55. The method according to claim 54, wherein the software card generating comprises modifying and deleting selected software cards.

56. The method according to claim 53, wherein the structuring comprises querying the plurality of stored software cards.

57. The method according to claim 56, wherein the querying returns software cards classified according to a specific category in a logical sequence of order for servicing the machine.

58. The method according to claim 53, wherein the structuring comprises viewing the blocks of information pointed to by each of the plurality of software cards.

59. The method according to claim 53, wherein the structuring comprises packaging the plurality of software cards in a predetermined order.

60. The method according to claim 59, wherein the structuring comprises viewing the software card packages.

61. The method according to claim 53, wherein the structuring comprises viewing previously saved queries and results.

62. The method according to claim 53, further comprising configuring a second computing unit to serve the plurality of stored documentation, the plurality of stored software cards, and the software card structuring to the first computing unit over a network.

63. A method in a computer system for displaying a plurality of software cards used to structure information contained in a plurality of documentation for facilitating training of personnel in servicing a machine, comprising:
  displaying a screen view for generating each of the plurality of software cards for a predetermined card category, wherein each software card points to blocks of information in the plurality of documentation that relate to the predetermined card category and wherein each software card provides a collection of specifically defined attributes that describe information used to train personnel in servicing the machine and its location within the documentation storage unit, wherein the collection of specifically defined attributes are categorize and ordered in a hierarchical manner for facilitating the training of personnel in servicing the machine;
  displaying a screen view for storing the plurality of generated software cards;
  displaying a screen view for querying the plurality of stored software cards;
  displaying a screen view for viewing previously saved queries and results; and
  displaying a screen view for viewing the blocks of information pointed to by the each of the plurality of software cards.

64. The method according to claim 63, further comprising displaying a screen view for modifying and deleting selected software cards in response to selecting the screen view for generating each of the plurality of software cards.

65. The method according to claim 63, wherein the displaying of a screen view for querying the plurality of stored software cards comprises a screen view that requests a user enter a plurality of parameters.

66. The method according to claim 65, wherein the plurality of parameters comprises skill level of the user, primary purpose and secondary purpose for retrieving information, document category and type of block.

67. The method according to claim 63, further comprising displaying a screen view for packaging the plurality of software cards in a predetermined order that facilitates the servicing of the machine.

68. The method according to claim 67, wherein the screen view for packaging the plurality of software cards comprises displaying a screen view that is divided into a viewing area that displays details of a card in the predetermined order and another viewing area that displays actual documentation information used to service the machine.

69. A computer-readable medium storing computer instructions for instructing a computer system to generate a plurality of software cards from information contained in a plurality of documentation used to facilitate training of personnel in servicing a machine, the computer instructions comprising:
  storing the plurality of documentation which relates to at least one of training the personnel and servicing the machine;
  generating each of the plurality of software cards for a predetermined card category that relates to servicing the machine, wherein each software card points to blocks of stored documentation that relate to the predetermined card category and wherein each software card provides a collection of specifically defined attributes that describe information used to train personnel in servicing the machine and its location within the documentation storage unit, wherein the collection of specifically defined attributes are categorized and ordered in a hierarchical manner for facilitating the training of personnel in servicing the machine; and
  storing the generated plurality of software cards.

70. The computer-readable medium according to claim 69, wherein the software card generating instructions comprises instructions for modifying and deleting each of the plurality of stored software cards.

71. The computer-readable medium according to claim 69, further comprising instructions for querying the stored software cards.

72. The computer-readable medium according to claim 71, wherein the querying instructions returns software cards classified according to a specific category in a logical sequence of order for servicing the machine.

73. The computer-readable medium according to claim 69, further comprising instructions for viewing the blocks of information pointed to by each of the plurality of software cards.

74. The computer-readable medium according to claim 69, further comprising instructions for packaging the plurality of software cards in a predetermined order.

75. The computer-readable medium according to claim 74, further comprising instructions for viewing the software card packages.

76. The computer-readable medium according to claim 69, further comprising instructions for viewing previously saved queries and results.

77. A computer-readable medium storing computer instructions for instructing a computer system to structure information contained in a plurality of documentation into a plurality of software cards used for facilitating training of personnel in servicing a machine, the computer instructions comprising:
  storing the plurality of documentation which relates to at least one of training the personnel and servicing the machine;
  generating each of the plurality of software cards for a predetermined card category that relates to servicing the machine, wherein each software card points to blocks of information in the stored plurality of documentation that relate to the predetermined card category and wherein each software card provides a collection of specifically defined attributes that describe information used to train personnel in servicing the machine and its location within the documentation storage unit, wherein the collection of specifically defined attributes are categorized and ordered in a hierarchical manner for facilitating the training of personnel in servicing the machine;

storing the generated plurality of software cards;

querying the plurality of stored software cards;

viewing previously saved queries and results; and viewing the blocks of information pointed to by each of the plurality of software cards.

78. The computer-readable medium according to claim 77, wherein the software card generating instructions comprise instructions for modifying and deleting selected software cards.

79. The computer-readable medium according to claim 77, wherein the querying instructions return software cards classified according to a specific category in a logical sequence of order for servicing the machine.

80. The computer-readable medium according to claim 77, further comprising instructions for packaging the plurality of software cards in a predetermined order.

81. The computer-readable medium according to claim 80, further comprising instructions for viewing the software card packages.

82. A computer-readable medium storing computer instructions for instructing a computer system to manage a plurality of documentation used to facilitate training of personnel in servicing a machine, the computer instructions comprising:

storing the plurality of documentation which relates to at least one of training the personnel and servicing the machine;

storing a plurality of software cards, wherein each software card points to blocks of information stored in the plurality of documentation that relate to a predetermined card category and wherein each software card provides a collection of specifically defined attributes that describe information used to train personnel in servicing the machine and its location within the documentation storage unit, wherein the collection of specifically defined attributes are categorized and ordered in a hierarchical manner for facilitating the training of personnel in servicing the machine;

structuring the plurality of stored documentation in accordance with the plurality of software cards; and configuring a first computing unit to perform the structuring.

83. The computer-readable medium according to claim 82, wherein the structuring instructions comprise instructions for generating each of the plurality of software cards for a predetermined card category that relates to servicing the machine.

84. The computer-readable medium according to claim 83, wherein the software card generating instructions comprise instructions for modifying and deleting selected software cards.

85. The computer-readable medium according to claim 82, wherein the structuring instructions comprises instructions for querying the plurality of stored software cards.

86. The computer-readable medium according to claim 85, wherein the querying instructions return software cards classified according to a specific category in a logical sequence of order for servicing the machine.

87. The computer-readable medium according to claim 82, wherein the structuring instructions comprises instructions for viewing the blocks of information pointed to by each of the plurality of software cards.

88. The computer-readable medium according to claim 82, wherein the structuring instructions comprises instructions for packaging the plurality of software cards in a predetermined order.

89. The computer-readable medium according to claim 88, wherein the structuring comprises instructions for viewing the software card packages.

90. The computer-readable medium according to claim 82, wherein the structuring instructions comprises instructions for viewing previously saved queries and results.

91. The computer-readable medium according to claim 82, further comprising instructions for configuring a second computing unit to serve the plurality of stored documentation, the plurality of stored software cards, and the software card structuring to the first computing unit over a network.

92. A computer-readable data transmission medium containing computer instructions for instructing a computer system to generate a plurality of software cards from information contained in a plurality of documentation used to facilitate training of personnel in servicing a machine, the computer instructions comprising:

storing the plurality of documentation which relates to at least one of training the personnel and servicing the machine;

generating each of the plurality of software cards for a predetermined card category, wherein each software card points to blocks of stored documentation that relate to the predetermined card category and wherein each software card provides a collection of specifically defined attributes that describe information used to train personnel in servicing the machine and its location within the documentation storage unit, wherein the collection of specifically defined attributes are categorized and ordered in a hierarchical manner for facilitating the training of personnel in servicing the machine; and storing the generated plurality at software cards.

93. A computer-readable data transmission medium containing computer instructions for instructing a computer system to structure information contained in a plurality of documentation into a plurality of software cards that are used to facilitate training of personnel in servicing a machine, the computer instructions comprising:

storing the plurality of documentation which relates to at least one of training personnel and servicing the machine;

generating each of the plurality of software cards for a predetermined card category, wherein each software card points to blocks of information in the stored plurality of documentation that relate to the predetermined card category and wherein each software card provides a collection of specifically defined attributes that describe information used to train personnel in servicing the machine and its location within the documentation storage unit, wherein the collection of specifically defined attributes are categorized and ordered in a hierarchical manner for facilitating the training of personnel in servicing the machine;

storing the generated plurality of software cards;

querying the plurality of stored software cards;

viewing previously saved queries and results; and viewing the blocks of information pointed to by each of the plurality of software cards.

94. A computer-readable data transmission medium containing computer instructions for instructing a computer system to manage a plurality of documentation used to facilitate training of personnel in servicing a machine, the computer instructions comprising:

storing the plurality of documentation which relates to at least one of training the personnel and servicing the machine;

storing a plurality of software cards, wherein each software card points to blocks of information stored in the plurality of documentation that relate to a predetermined card category and wherein each software card provides a collection of specifically defined attributes that describe information used to train personnel in servicing the machine and its location within the documentation storage unit, wherein the collection of specifically defined attributes are categorized and ordered in a hierarchical manner for facilitating the training of personnel in servicing the machine;

structuring the plurality of stored documentation in accordance with the plurality of software cards; and configuring a first computing unit to perform the structuring.

95. A computer-readable medium containing a collection of information for structuring a plurality of documentation used to facilitate training of personnel in servicing a machine, comprising:

a block table containing a plurality of fields for describing blocks of information in the plurality of documentation that relates to servicing the machine:

a software card table containing a plurality of fields describing the information content of a block in the form of a software card, wherein each software card provides a collection of specifically defined attributes that describe information used to train personnel in servicing the machine and its location within the documentation storage unit, wherein the collection of specifically defined attributes are categorized and ordered in a hierarchical manner for facilitating the training of personnel in servicing the machine;

a query table containing a plurality of fields describing previously saved queries; and a view table containing a plurality of fields for viewing the blocks of information in the plurality of documentation.

96. The computer-readable medium according to claim 95, further comprising a documentation location table containing a plurality of fields describing the location of each of the plurality of documentation.

97. The computer-readable medium according to claim 95, further comprising a keyword table describing a list of keywords.

98. The computer-readable medium according to claim 95, wherein the query table comprises a query results table containing a plurality of fields that record previously saved query results.

99. The computer-readable medium according to claim 95, wherein the query table comprises a query parameter table containing a plurality of fields that store parameter names and values for previously saved queries.

* * * * *

UNITED STATES PATENT AND TRADEMARK OFFICE
CERTIFICATE OF CORRECTION

PATENT NO. : 6,745,195 B1
DATED : June 1, 2004
INVENTOR(S) : Mark M. Kornfein et al.

It is certified that error appears in the above-identified patent and that said Letters Patent is hereby corrected as shown below:

Column 16,
Line 27, please delete "points to blocks Of information stored in the documen-" and insert -- points to blocks of information stored in the documen- --

Column 17,
Line 8, please delete "machine and Its location within the documentation" and insert -- machine and its location within the documentation --

Column 20,
Line 36, please delete "viewing the software car packages." and insert -- viewing the software card packages. --

Signed and Sealed this

Fourteenth Day of December, 2004

JON W. DUDAS
*Director of the United States Patent and Trademark Office*